(12) United States Patent
Talamonti et al.

(10) Patent No.: US 10,451,730 B2
(45) Date of Patent: Oct. 22, 2019

(54) LANE CHANGE ASSISTANT

(71) Applicant: Ford Global Technologies, LLC, Dearborn, MI (US)

(72) Inventors: Walter Joseph Talamonti, Canton, MI (US); Louis Tijerina, Dearborn, MI (US); Steven Joseph Szwabowski, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 38 days.

(21) Appl. No.: 15/608,292

(22) Filed: May 30, 2017

(65) Prior Publication Data

US 2018/0281854 A1 Oct. 4, 2018

Related U.S. Application Data

(60) Provisional application No. 62/479,633, filed on Mar. 31, 2017.

(51) Int. Cl.
  *G01S 13/93* (2006.01)
  *B60K 35/00* (2006.01)
  (Continued)

(52) U.S. Cl.
  CPC ............ *G01S 13/931* (2013.01); *B60K 35/00* (2013.01); *B60K 37/02* (2013.01); *B60W 30/09* (2013.01);
  (Continued)

(58) Field of Classification Search
  CPC .......... G01S 13/931; G01S 2013/9353; G08G 1/162; G08G 1/096822; G08G 1/205;
  (Continued)

(56) References Cited

U.S. PATENT DOCUMENTS 5,521,579 A * 5/1996 Bernhard ........... B60K 31/0008
                                                           180/167
5,529,138 A    6/1996 Shaw et al.
(Continued)

FOREIGN PATENT DOCUMENTS

CN    102785661 A    11/2012
CN    105620480 A    6/2016
(Continued)

OTHER PUBLICATIONS

Search Report from United Kingdom Intellectual Property Office dated Aug. 24, 2018 regarding Application No. GB1805050.0 (3 pages).

(Continued)

*Primary Examiner* — Jaime Figueroa
(74) *Attorney, Agent, or Firm* — Frank MacKenzie; Bejin Bieneman PLC

(57) ABSTRACT

A computing device in a vehicle can determine a time bound for a lane change maneuver based on determining a reaction time, an occupant acceptance time, a vehicle maneuver time and a maneuver cancellation time and request authorization to perform the lane change maneuver. The computing device can determine the time bound has expired, and cancel the authorization request based on the expired time bound.

20 Claims, 19 Drawing Sheets

(51) Int. Cl.

| | | |
|---|---|---|
| G08G 1/00 | (2006.01) | |
| B60W 50/16 | (2012.01) | |
| B60W 30/18 | (2012.01) | |
| B62D 15/02 | (2006.01) | |
| G08G 1/16 | (2006.01) | |
| B60W 30/09 | (2012.01) | |
| G08G 1/0968 | (2006.01) | |
| G05D 1/02 | (2006.01) | |
| B60K 37/02 | (2006.01) | |
| G02B 27/01 | (2006.01) | |
| G06F 3/01 | (2006.01) | |
| B60W 40/09 | (2012.01) | |
| G08G 1/0967 | (2006.01) | |

(52) U.S. Cl.
CPC ...... *B60W 30/18163* (2013.01); *B60W 50/16* (2013.01); *B62D 15/025* (2013.01); *B62D 15/029* (2013.01); *B62D 15/0255* (2013.01); *G02B 27/01* (2013.01); *G05D 1/0212* (2013.01); *G05D 1/0214* (2013.01); *G06F 3/016* (2013.01); *G08G 1/096822* (2013.01); *G08G 1/162* (2013.01); *G08G 1/166* (2013.01); *G08G 1/167* (2013.01); *G08G 1/205* (2013.01); *B60K 2370/161* (2019.05); *B60K 2370/172* (2019.05); *B60K 2370/179* (2019.05); *B60W 40/09* (2013.01); *B60W 2550/30* (2013.01); *G01S 2013/9353* (2013.01); *G08G 1/096716* (2013.01); *G08G 1/16* (2013.01); *G08G 1/164* (2013.01)

(58) Field of Classification Search
CPC ........ G08G 1/166; G08G 1/167; G08G 1/164; G08G 1/096716; G08G 1/16; B62D 15/0255; B62D 15/029; B62D 15/025; B60W 50/16; B60W 30/18163; B60W 30/09; B60W 40/09; B60W 2550/30; B60K 37/02; G05D 1/0212; G05D 1/0214; G02B 27/01; G06F 3/016
USPC ..................................................... 701/1, 301
See application file for complete search history.

(56) References Cited

U.S. PATENT DOCUMENTS

| | | | |
|---|---|---|---|
| 6,813,562 B2 | 11/2004 | Altan et al. | |
| 7,245,231 B2 | 7/2007 | Kiefer et al. | |
| 7,292,152 B2 | 11/2007 | Torkkola et al. | |
| 7,519,471 B2 | 4/2009 | Shibata et al. | |
| 7,579,942 B2 | 8/2009 | Kalik | |
| 7,797,107 B2 | 9/2010 | Shiller | |
| 8,086,406 B2 | 12/2011 | Ewerhart et al. | |
| 8,170,739 B2 | 5/2012 | Lee | |
| 8,260,498 B2 | 9/2012 | Deng | |
| 8,374,743 B2 | 2/2013 | Salinger | |
| 8,615,357 B2 | 12/2013 | Simon | |
| 8,781,170 B2 | 7/2014 | Mathieu et al. | |
| 8,918,273 B2 | 12/2014 | Knoop et al. | |
| 9,020,732 B2 | 4/2015 | Pilutti et al. | |
| 9,108,664 B2 | 8/2015 | Lee | |
| 9,211,911 B2 | 12/2015 | Stahlin | |
| 9,229,453 B1 | 1/2016 | Lee | |
| 9,266,429 B2 | 2/2016 | Tippelhofer et al. | |
| 9,731,762 B2 | 8/2017 | Hass et al. | |
| 10,068,472 B2* | 9/2018 | Young | G08G 1/0133 |
| 10,108,195 B2* | 10/2018 | Silvlin | G05D 1/0088 |
| 2002/0109668 A1 | 8/2002 | Rosenberg et al. | |
| 2005/0273263 A1 | 12/2005 | Egami et al. | |
| 2008/0201050 A1* | 8/2008 | Placke | B60W 10/06 |
| | | | 701/70 |
| 2009/0210157 A1* | 8/2009 | Lee | G01S 15/87 |
| | | | 701/301 |
| 2011/0029235 A1 | 2/2011 | Berry | |
| 2012/0041632 A1 | 2/2012 | Garcia Bordes | |
| 2013/0057397 A1 | 3/2013 | Cutler et al. | |
| 2013/0211687 A1* | 8/2013 | Trost | B60T 7/22 |
| | | | 701/70 |
| 2014/0067206 A1* | 3/2014 | Pflug | B60W 10/04 |
| | | | 701/41 |
| 2014/0067250 A1 | 3/2014 | Bone et al. | |
| 2014/0222331 A1 | 8/2014 | Dorum et al. | |
| 2015/0120137 A1 | 4/2015 | Zeng et al. | |
| 2015/0344034 A1 | 12/2015 | Niino et al. | |
| 2016/0001781 A1* | 1/2016 | Fung | B60W 40/08 |
| | | | 701/36 |
| 2016/0082971 A1 | 3/2016 | Fuehrer | |
| 2016/0091896 A1 | 3/2016 | Maruyama | |
| 2016/0185388 A1 | 6/2016 | Sim | |
| 2016/0231746 A1* | 8/2016 | Hazelton | G05D 1/0257 |
| 2016/0280265 A1 | 9/2016 | Hass et al. | |
| 2016/0304126 A1 | 10/2016 | Yamaoka et al. | |
| 2016/0332569 A1 | 11/2016 | Ishida et al. | |
| 2017/0001646 A1 | 1/2017 | Cooke et al. | |
| 2017/0001650 A1 | 1/2017 | Park | |
| 2017/0113665 A1* | 4/2017 | Mudalige | G08G 1/166 |
| 2017/0253122 A1 | 9/2017 | Jun et al. | |
| 2017/0259819 A1 | 9/2017 | Takeda | |
| 2017/0336788 A1 | 11/2017 | Iagnemma | |
| 2017/0349173 A1* | 12/2017 | Nishiguchi | B60W 30/09 |
| 2017/0349175 A1 | 12/2017 | Brandin et al. | |
| 2017/0369055 A1* | 12/2017 | Saigusa | G08G 1/096791 |
| 2018/0178716 A1 | 6/2018 | Fujii | |
| 2018/0196436 A1 | 7/2018 | Gupta | |
| 2018/0357904 A1 | 12/2018 | Miyata | |

FOREIGN PATENT DOCUMENTS

| | | |
|---|---|---|
| CN | 106926844 A | 7/2017 |
| DE | 10012737 A1 | 9/2001 |
| DE | 102009020649 A1 | 11/2010 |
| DE | 102011012793 A1 | 9/2012 |
| DE | 102011082606 A1 | 3/2013 |
| DE | 102012214829 A1 | 2/2014 |
| DE | 102013012121 A1 | 1/2015 |
| DE | 102013214225 A1 | 1/2015 |
| DE | 102014213019 A1 | 1/2016 |
| DE | 102016204957 A1 | 9/2016 |
| EP | 1967821 A1 | 9/2008 |
| EP | 2618108 A1 | 7/2013 |
| EP | 2963632 A1 | 1/2016 |
| GB | 2486942 A | 4/2012 |
| JP | 2013130463 A | 7/2013 |
| KR | 101371746 B1 | 3/2014 |
| KR | 20140080871 A | 7/2014 |
| WO | 2009155228 A1 | 12/2009 |
| WO | 2012119596 A1 | 9/2012 |
| WO | 2015106913 A1 | 7/2015 |
| WO | 2017034771 A1 | 3/2017 |
| WO | 2017056726 A1 | 4/2017 |

OTHER PUBLICATIONS

Search Report from United Kingdom Intellectual Property Office dated Aug. 30, 2018 regarding Application No. GB1805228.2 (4 pages).

Search Report from United Kingdom Intellectual Property Office dated Sep. 5, 2018 regarding Application No. GB18051819 (3 pages).

Search Report from United Kingdom Intellectual Property Office dated Sep. 13, 2018 regarding Application No. GB1805197.9 (3 pages).

Search Report from United Kingdom Intellectual Property Office dated Sep. 24, 2018 regarding Application No. GB1805213.4 (4 pages).

Search Report from United Kingdom Intellectual Property Office dated Sep. 25, 2018 regarding Application No. GB1805190.4 (3 pages).

(56) References Cited

OTHER PUBLICATIONS

Non-Final Office Action dated Oct. 18, 2018 for U.S. Appl. No. 15/608,309 (39 pages).
Non-Final Office Action dated Feb. 16, 2018 for U.S. Appl. No. 15/608,267 (20 pages).
Notice of Allowance dated Nov. 13, 2018 regarding U.S. Appl. No. 15/608,250 (52 pages).
"BMW Innovation Days Highlight Future BMW Technologies", http://f30.bimmerpost.com/forums/showthread.php?t=594473 (72 pages).
"Rollstuhlverladehilfe Robot 3000 in einem TESLA M ODEL S", YouTube, https://www.youtube.com/watch?v=67WDGIds_pM (3 pages).
Final Office Action dated Jan. 30, 2019 for U.S. Appl. No. 15/608,309 (27 pages).
Non-Final Office Action dated Feb. 8, 2019 for U.S. Appl. No. 15/608,266 (66 pages).
Non-Final Office Action dated Apr. 19, 2019 for U.S. Appl. No. 15/608,290 (65 pages).
Final Office Action dated Sep. 6, 2019 for U.S. Appl. No. 15/608,266 (62 pages).

* cited by examiner

LANE CHANGE ASSISTANT

This application claims priority to and all benefits of provisional Application No. 62/479,633, filed Mar. 31, 2017, the contents of which are incorporated herein by reference in their entirety.

BACKGROUND

Vehicles can be equipped to operate in both autonomous and occupant piloted mode. Vehicles can be equipped with computing devices, networks, sensors and controllers to acquire information regarding the vehicle's environment and to pilot the vehicle based on the information. A computing device can also be equipped with computing devices, networks, sensors and controllers to acquire information regarding the vehicle's occupants and to pilot the vehicle based on the information. Vehicles in autonomous mode can provide occupants with the ability to move seating around to socialize, recline seats to sleep or view video screens, free from the need to watch the roadway.

DETAILED DESCRIPTION

Figure 1:
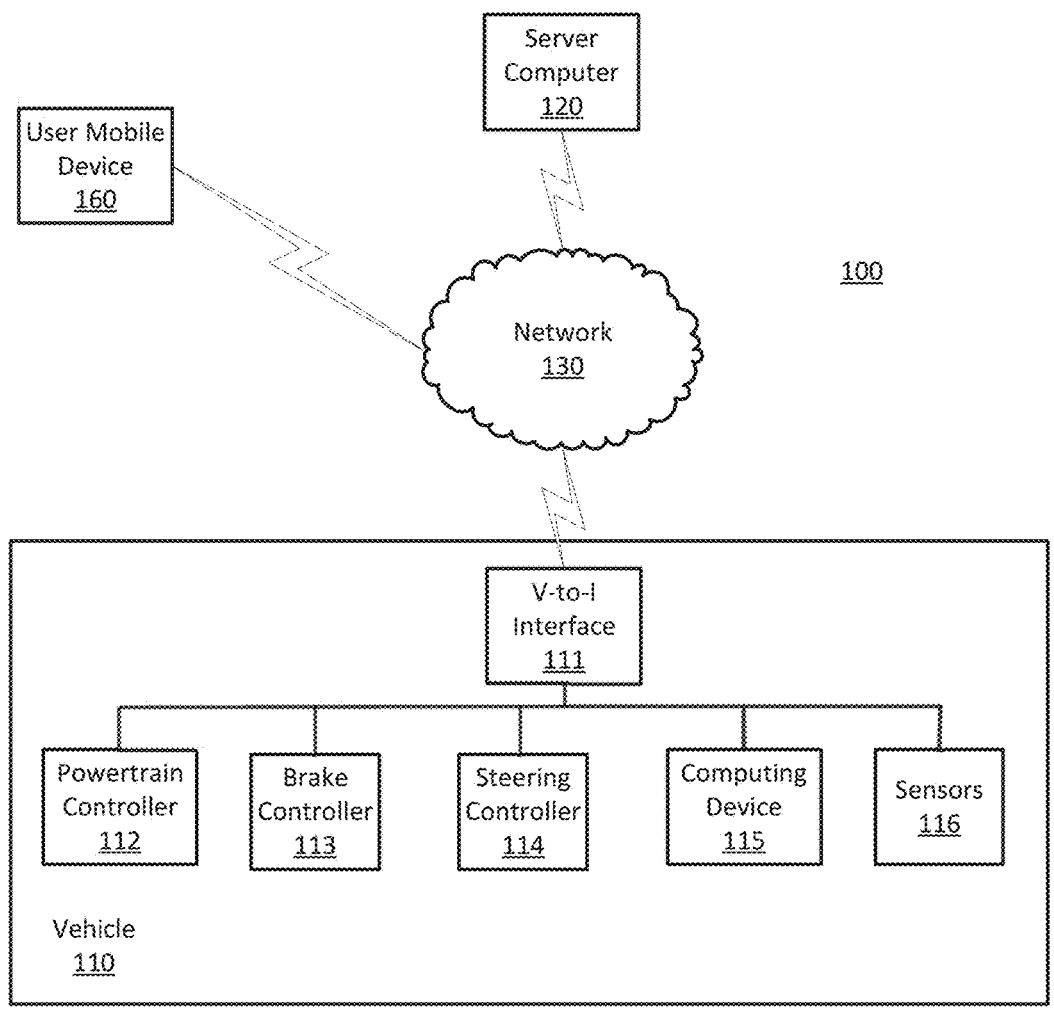
FIG. 1 is a block diagram of an example vehicle.

Vehicles can be equipped to operate in both autonomous and occupant piloted mode. By a semi- or fully-autonomous mode, we mean a mode of operation wherein a vehicle can be piloted by a computing device as part of a vehicle information system having sensors and controllers. The vehicle can be occupied or unoccupied, but in either case the vehicle can be piloted without assistance of an occupant. For purposes of this disclosure, an autonomous mode is defined as one in which each of vehicle propulsion (e.g., via a powertrain including an internal combustion engine and/or electric motor), braking, and steering are controlled by one or more vehicle computers; in a semi-autonomous mode the vehicle computer(s) control(s) one or two of vehicle propulsion, braking, and steering.

Vehicles can be equipped with computing devices, networks, sensors and controllers to pilot the vehicle and to determine maps of the surrounding real, i.e., physical, world including features such as roads. Vehicles can be piloted and maps can be determined based on locating and identifying road signs in the surrounding real world. By piloting we mean directing the movements of a vehicle so as to move the vehicle along a roadway or other portion of a path.

Disclosed herein is method, comprising determining a time bound for a lane change maneuver based on determining a reaction time, an occupant acceptance time, a vehicle maneuver time and a maneuver cancellation time, requesting authorization to perform the lane change maneuver, determining the time bound has expired; and canceling the authorization request based on the expired time bound. Determining the reaction time can be based on predetermined values and determining the occupant acceptance time based on the reaction time and the vehicle maneuver time. Determining the vehicle maneuver time can be based on the time during which vehicle can execute a lane change maneuver and determining the maneuver cancellation time based on determining the end of the lane change maneuver.

Determining the time bound has expired can include determining that the lane change maneuver cannot be performed within the remaining time bound and determining the time bound has expired can include determining that decision time and occupant acceptance time has expired. Input can be received and the authorization request can be responded to before the time bound expires and then the vehicle can be controlled to perform the lane change maneuver. Determining the lane change maneuver can include adapting a vehicle trajectory to vehicle traffic in an adjacent lane and adapting the vehicle trajectory to vehicle traffic in the adjacent lane can include adapting vehicle position, vehicle speed, and vehicle direction to vehicle traffic in the adjacent lane. Adapting the vehicle trajectory to vehicle traffic in the adjacent lane can include determining adjacent lane vehicle trajectories and determining occupant acceptance time can include reaction time remaining plus the maneuver time. Determining maneuver time as a time from the beginning of a first lane change maneuver to a time of the beginning of a last lane change maneuver and determining maneuver cancellation time as time remaining until the end of the lane change maneuver.

Further disclosed is a computer readable medium storing program instructions for executing some or all of the above method steps. Further disclosed is a computer programmed for executing some or all of the above method steps, including a computer apparatus, programmed to determine a time bound for a lane change maneuver based on determining a reaction time, an occupant acceptance time, a vehicle maneuver time, and a maneuver cancellation time, request authorization to perform the lane change maneuver, determine the time bound has expired, and cancel the authorization request based on the time bound having expired. The computer can be further programmed to determine the reaction time based on predetermined values and determine the occupant acceptance time based on the reaction time and the vehicle maneuver time. The computer can be further programmed to determine the vehicle maneuver time based on the time during which a vehicle can execute the lane change maneuver and determine the maneuver cancellation time based on determining an end of the lane change maneuver.

The computer can be further programmed to determine the time bound has expired including determine that the lane change maneuver cannot be performed and determine the time bound has expired includes determine that the reaction time and the occupant acceptance time has expired. The computer can be further programmed to receive input responding to the authorization request before the time bound expires and then control a vehicle to perform the lane change maneuver and determine the lane change maneuver including adapt vehicle trajectory to vehicle traffic in an adjacent lane, wherein adapt the vehicle trajectory to vehicle traffic in the adjacent lane includes adapt vehicle position, vehicle speed, and vehicle direction to traffic in the adjacent lane.

FIG. 1 is a diagram of a vehicle information system 100 that includes a vehicle 110 operable in autonomous ("autonomous" by itself in this disclosure means "fully autonomous") and occupant piloted (also referred to as non-autonomous) mode in accordance with disclosed implementations. Vehicle 110 also includes one or more computing devices 115 for performing computations for piloting the vehicle 110 during autonomous operation. Computing devices 115 can receive information regarding the operation of the vehicle from sensors 116.

The computing device 115 includes a processor and a memory such as are known. Further, the memory includes one or more forms of computer-readable media, and stores instructions executable by the processor for performing various operations, including as disclosed herein. For example, the computing device 115 may include programming to operate one or more of vehicle brakes, propulsion (e.g., control of acceleration in the vehicle 110 by controlling one or more of an internal combustion engine, electric motor, hybrid engine, etc.), steering, climate control, interior and/or exterior lights, etc., as well as to determine whether and when the computing device 115, as opposed to a human operator, is to control such operations.

The computing device 115 may include or be communicatively coupled to, e.g., via a vehicle communications bus as described further below, more than one computing devices, e.g., controllers or the like included in the vehicle 110 for monitoring and/or controlling various vehicle components, e.g., a powertrain controller 112, a brake controller 113, a steering controller 114, etc. The computing device 115 is generally arranged for communications on a vehicle communication network such as a bus in the vehicle 110 such as a controller area network (CAN) or the like; the vehicle 110 network can include wired or wireless communication mechanism such as are known, e.g., Ethernet or other communication protocols.

Via the vehicle network, the computing device 115 may transmit messages to various devices in the vehicle and/or receive messages from the various devices, e.g., controllers, actuators, sensors, etc., including sensors 116. Alternatively, or additionally, in cases where the computing device 115 actually comprises multiple devices, the vehicle communication network may be used for communications between devices represented as the computing device 115 in this disclosure. Further, as mentioned below, various controllers or sensing elements may provide data to the computing device 115 via the vehicle communication network.

In addition, the computing device 115 may be configured for communicating through a vehicle-to-infrastructure (V-to-I) interface 111 with a remote server computer 120, e.g., a cloud server, via a network 130, which, as described below, may utilize various wired and/or wireless networking technologies, e.g., cellular, BLUETOOTH® and wired and/or wireless packet networks. Computing device 115 may be configured for communicating with other vehicles 110 through V-to-I interface 111 using vehicle-to-vehicle (V-to-V) networks formed on an ad hoc basis among nearby vehicles 110 or formed through infrastructure-based networks. The computing device 115 also includes nonvolatile memory such as is known. Computing device 115 can log information by storing the information in nonvolatile memory for later retrieval and transmittal via the vehicle communication network and a vehicle to infrastructure (V-to-I) interface 111 to a server computer 120 or user mobile device 160.

As already mentioned, generally included in instructions stored in the memory and executed by the processor of the computing device 115 is programming for operating one or more vehicle 110 components, e.g., braking, steering, propulsion, etc., without intervention of a human operator. Using data received in the computing device 115, e.g., the sensor data from the sensors 116, the server computer 120, etc., the computing device 115 may make various determinations and/or control various vehicle 110 components and/or operations without a driver to operate the vehicle 110. For example, the computing device 115 may include programming to regulate vehicle 110 operational behaviors such as speed, acceleration, deceleration, steering, etc., as well as tactical behaviors such as a distance between vehicles and/or amount of time between vehicles, lane-change, minimum gap between vehicles, left-turn-across-path minimum, time-to-arrival at a particular location and intersection (without signal) minimum time-to-arrival to cross the intersection.

Controllers, as that term is used herein, include computing devices that typically are programmed to control a specific vehicle subsystem. Examples include a powertrain controller 112, a brake controller 113, and a steering controller 114. A controller may be an electronic control unit (ECU) such as is known, possibly including additional programming as described herein. The controllers may communicatively be connected to and receive instructions from the computing device 115 to actuate the subsystem according to the instructions. For example, the brake controller 113 may receive instructions from the computing device 115 to operate the brakes of the vehicle 110.

The one or more controllers 112, 113, 114 for the vehicle 110 may include known electronic control units (ECUs) or the like including, as non-limiting examples, one or more powertrain controllers 112, one or more brake controllers 113 and one or more steering controllers 114. Each of the controllers 112, 113, 114 may include respective processors and memories and one or more actuators. The controllers 112, 113, 114 may be programmed and connected to a vehicle 110 communications bus, such as a controller area network (CAN) bus or local interconnect network (LIN) bus, to receive instructions from the computer 115 and control actuators based on the instructions.

Sensors 116 may include a variety of devices known to provide data via the vehicle communications bus. For example, a radar fixed to a front bumper (not shown) of the vehicle 110 may provide a distance from the vehicle 110 to a next vehicle in front of the vehicle 110, or a global positioning system (GPS) sensor disposed in the vehicle 110 may provide geographical coordinates of the vehicle 110. The distance(s) provided by the radar and/or other sensors 116 and/or the geographical coordinates provided by the GPS sensor may be used by the computing device 115 to operate the vehicle 110 autonomously or semi-autonomously.

The vehicle 110 is generally a land-based autonomous vehicle 110 having three or more wheels, e.g., a passenger car, light truck, etc. The vehicle 110 includes one or more sensors 116, the V-to-I interface 111, the computing device 115 and one or more controllers 112, 113, 114.

The sensors 116 may be programmed to collect data related to the vehicle 110 and the environment in which the vehicle 110 is operating. By way of example, and not limitation, sensors 116 may include, e.g., altimeters, cameras, LIDAR, radar, ultrasonic sensors, infrared sensors, pressure sensors, accelerometers, gyroscopes, temperature sensors, pressure sensors, hall sensors, optical sensors, voltage sensors, current sensors, mechanical sensors such as switches, etc. The sensors 116 may be used to sense the environment in which the vehicle 110 is operating such as weather conditions, the grade of a road, the location of a road or locations of neighboring vehicles 110. The sensors 116 may further be used to collect data including dynamic vehicle 110 data related to operations of the vehicle 110 such as velocity, yaw rate, steering angle, engine speed, brake pressure, oil pressure, the power level applied to controllers 112, 113, 114 in the vehicle 110, connectivity between components and electrical and logical health of the vehicle 110.

Figure 2:
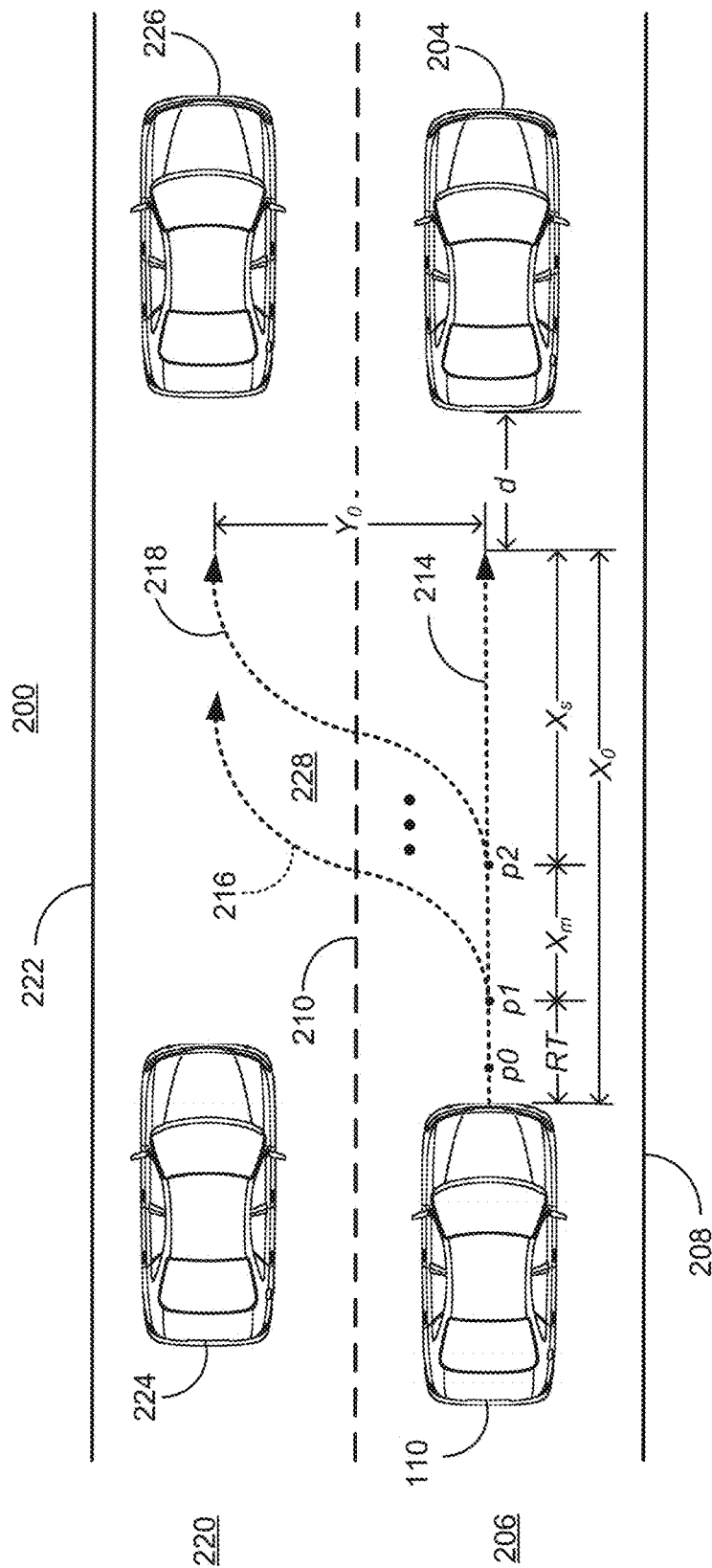
FIG. 2 is a diagram of an example traffic scene.

FIG. 2 is a diagram of a traffic scene 200, wherein a vehicle 110 is traveling in a traffic lane 206 on a roadway defined by a right lane marker 208 and a lane divider 210. As discussed above in relation to FIG. 1, computing device 115 in vehicle 110 can determine a vehicle 110 trajectory, including position, speed, direction, lateral acceleration and longitudinal acceleration, where position is represented by X, Y coordinates on a plane substantially perpendicular to a supporting roadway, speed and direction are measured in the X, Y plane, and lateral and longitudinal acceleration are defined with respect to directions perpendicular and parallel, respectively, to the direction of vehicle 110 travel in the X, Y plane. Position, speed, direction and lateral and longitudinal accelerations can be determined by computing device 115 via sensors 116, for example, or via map data downloaded via V-to-I interface 111, for example. Computing device 115 can also determine a steerable path polynomial 214 to predict future trajectories of vehicle 110 in the X, Y plane based on the current trajectory of vehicle 110. Steerable path polynomial 214 in traffic scene 200 depicts the position portion of vehicle 110 trajectories at future time periods. For each position of vehicle 110 included in steerable path polynomial 214, computing device 115 can predict speed, direction and lateral and longitudinal accelerations to predict vehicle 110 trajectories at future time steps represented by steerable path polynomial 214. In this case time steps can be as short as 100 milliseconds, for example, permitting steerable path polynomial 214 to be updated ten times per second, for example.

A steerable path polynomial 214 is a series of n connected points in the X, Y plane that include predicted vehicle 110 trajectories at n future time steps. The n connected points are determined by a polynomial function in the X, Y plane, where the X, Y axes are determined by the direction of vehicle 110, with the X direction being parallel to the direction of travel and the Y direction being perpendicular to the direction of travel, for example. Chebyshev's theorem states that n points can be represented exactly by a polynomial of degree (n−1). In this case n points, where n can be a large number, greater than 100 for example, can be represented by a polynomial of degree k, where, in this case, k can be a number less than or equal to 3, for example. The n connected points in a steerable path polynomial 214 can be represented by a polynomial function in X and Y of degree k or less. For example, a steerable path polynomial 214 can represent 10 seconds of elapsed time, and can be sampled at 100 milliseconds/sample or 10 Hz to yield n=100 sample points. In this example, the n=100 sample points in steerable path polynomial 214 can be represented by a polynomial function in X and Y of degree 3 or less, in this case degree 1, since steerable path polynomial 214 can be represented by a straight line.

The polynomial function in X and Y of degree k or less that represent the steerable path polynomial 214 can include one or more Bezier curves. Bezier curves are polynomial functions of degree k or less that each represent a disjoint subset of the n points, and that taken together, represent the entire set of n points. Bezier curves can be constrained to be continuously differentiable and have constraints or limits on the permitted derivatives, e.g. limits on the rates of change, with no discontinuities. Bezier curves can also be constrained to match derivatives with other Bezier curves at boundaries, providing smooth transitions between subsets. Constraints on Bezier curves can make a path polynomial a steerable path polynomial 214 by limiting the rates of longitudinal and lateral accelerations required to pilot a vehicle along the steerable path polynomial 214, where braking torque and powertrain torque are applied as positive and negative longitudinal accelerations and clockwise and counter clockwise steering torque are applied as left and right lateral accelerations. By determining lateral and longitudinal accelerations to achieve predetermined target values within predetermined constraints within predetermined numbers of time periods, the steerable path polynomial 214 can be used by computing device to determine a steerable path polynomial 214 that can be used to safely and comfortably pilot vehicle 110.

Computing device 115 can determine a steerable path polynomial 214 to predict future trajectories of vehicle 110 and update the steerable path polynomial 214 as vehicle 110 is piloted on steerable path polynomial 214 by updating a vehicle 110 trajectory to determine updated position, speed and direction, and lateral and longitudinal accelerations and comparing the updated position, speed and direction to predicted position, speed, direction and lateral and longitudinal accelerations from the steerable path polynomial 214. Computing device 115 can use this comparison between updated vehicle 110 trajectory and predicted trajectory in control theoretic calculations to determine outputs to controllers 112, 113, 114 that can control the trajectory of vehicle 110 reduce the difference between an updated trajectory and a steerable path polynomial 214 at future time steps, for example updating vehicle 110 outputs to controllers 112, 113, 114 in response to results of control theoretic calculations is included in vehicle 110 autonomous and semi-autonomous (assisted) piloting mode as discussed above in relation to FIG. 1.

Control theoretic calculations are calculations that can determine error signals based on a controllable process (e.g. controlling vehicle 110 trajectory), input the error signals to calculations and output control signals to control the process (vehicle 110 trajectory) that can reduce future error signals. Control theoretic calculations can be designed to produce stable output despite unwanted or extraneous input signal variation including signal noise, for example. Examples of control theoretic calculations that can be used to achieve stable output are time-series filters such as Kalman filters, which can reduce output variation by filtering input signals with a time series filter. Time series filters can use several samples from an input signal, sampled over several time steps, to form a single output sample. The result is that control theoretic calculations can require several time steps to acquire enough samples to provide a reliable output sample, where a reliable output sample is defined as an output sample that has a 99.99% probability of being correct within predetermined limits. This can cause a delay in producing reliable output samples upon starting a new control theoretic calculation, for example starting determination of a new steerable path polynomial 214.

In traffic scene 200, where vehicle 110 trajectories are represented by steerable path polynomial 214, computing device 115 can determine that vehicle 110 will reach a stopping distance d from parked second vehicle 204 at a time to collision $t_c$ which is the time to travel the collision distance $X_0$ at the current trajectory to reach stopping distance d from parked second vehicle 204, at which distance vehicle 110 must be braked to a stop to avoid a collision. Computing device 115 can be programmed to determine that vehicle 110 is approaching a stopping distance d from a parked second vehicle 110 and, if an occupant indicates an intention to stop, assist the occupant in stopping vehicle 110 along steerable path polynomial 214 short of the stopping distance d from a parked second vehicle 204. An occupant can indicate an intention to stop by stepping on a brake pedal, for example. Once the occupant indicates an intention to stop by stepping on a brake pedal, the computing device can send commands via controllers 112, 113, 114 to safely and comfortably stop the vehicle 110 at a location short of the stopping distance d from a parked second vehicle 204 regardless of the amount and duration of brake pedal pressure applied by the occupant, for example.

In other cases, the second vehicle 204 can be piloted in traffic lane 206 on a trajectory, wherein the speed of second vehicle 204 is less than the speed of vehicle 110. Rather than braking to a stop behind second vehicle 204, computing device 115 in vehicle 110 can adjust the trajectory of vehicle 110 in such a fashion as to position vehicle 110 at distance d from second vehicle 204 matching the speed of vehicle 204 to maintain a separation between vehicle 204 and second vehicle 204 of at least distance d. Piloting a vehicle in this fashion can be one mode of operation of an adaptive speed control program in computing device 115.

In addition to, and instead of, braking vehicle 110 to a stop, or matching speeds with second vehicle 204, computing device 115 can determine a plurality of virtual steering path polynomials 216, 218 for steering vehicle 110 into adjacent lane 220 without braking to a stop. In some cases, computing device 115 can be controlling vehicle 110 to maintain a constant speed. In these instances, the plurality of virtual steering path polynomials 216, 218 can represent steering paths that do not require vehicle 110 to reduce speed, for example. This can be the case when computing device 115 is assisting an occupant by directing controllers 112, 113, 114 to maintain vehicle 110 speed at an occupant-selected level, e.g. adaptive speed control or "cruise control", including executing lane change maneuvers.

The plurality of virtual steering path polynomials 216, 218 are represented by the ellipsis between the dashed lines representing the virtual steering path polynomials 216, 218. The area included by the plurality of virtual steering path polynomials 216, 218 comprises a field of safe travel 228. The plurality of virtual steering path polynomials 216, 218 are based on computing device 115 determining that traffic in adjacent lane 220, defined by left lane marker 222 and a lane divider 210, can permit computing device 115 or occupant to pilot vehicle 110 to execute a lane change maneuver safely and comfortably, since computing device determines virtual path polynomials 216, 218 based on predetermined targets and constraints for lateral and longitudinal acceleration. Adjacent lane traffic and determining when a lane change maneuver can be executed is discussed in relation to FIG. 15.

The virtual path polynomials 216, 218 can be used by computing device 115 to pilot vehicle 110 to execute a lane change maneuver, where trajectory of vehicle 110 can change from steerable path polynomial 214 to a trajectory at a lane width distance $Y_0$ from traffic lane 206 into adjacent traffic lane 220, while avoiding adjacent lane traffic including third vehicle 224 and fourth vehicle 226. The virtual path polynomials 216, 218 can also be used by computing device 115 to prompt an occupant to execute a lane change maneuver as shown in FIGS. 7-13.

Virtual path polynomials 216, 218 can also be used to prompt an occupant to input an intent to execute a lane change maneuver. An occupant can input an intent to execute a lane change maneuver by applying steering torque to a steering wheel 704 in the intended steering direction, for example. Computing device 115 can determine an occupant's intent and execute a lane change maneuver based on occupant input applied as torque on a steering wheel, for example. Computing device 115 can prompt an occupant and execute lane change maneuvers including updating prompts and lane change maneuvers, while vehicle 110 is being piloted in autonomous mode, occupant-piloted mode, or occupant assist (semi-autonomous) mode, including using adaptive speed control, where computing device 115 can be programmed to maintain a predetermined target speed, traffic and roadway conditions permitting.

Figure 15:
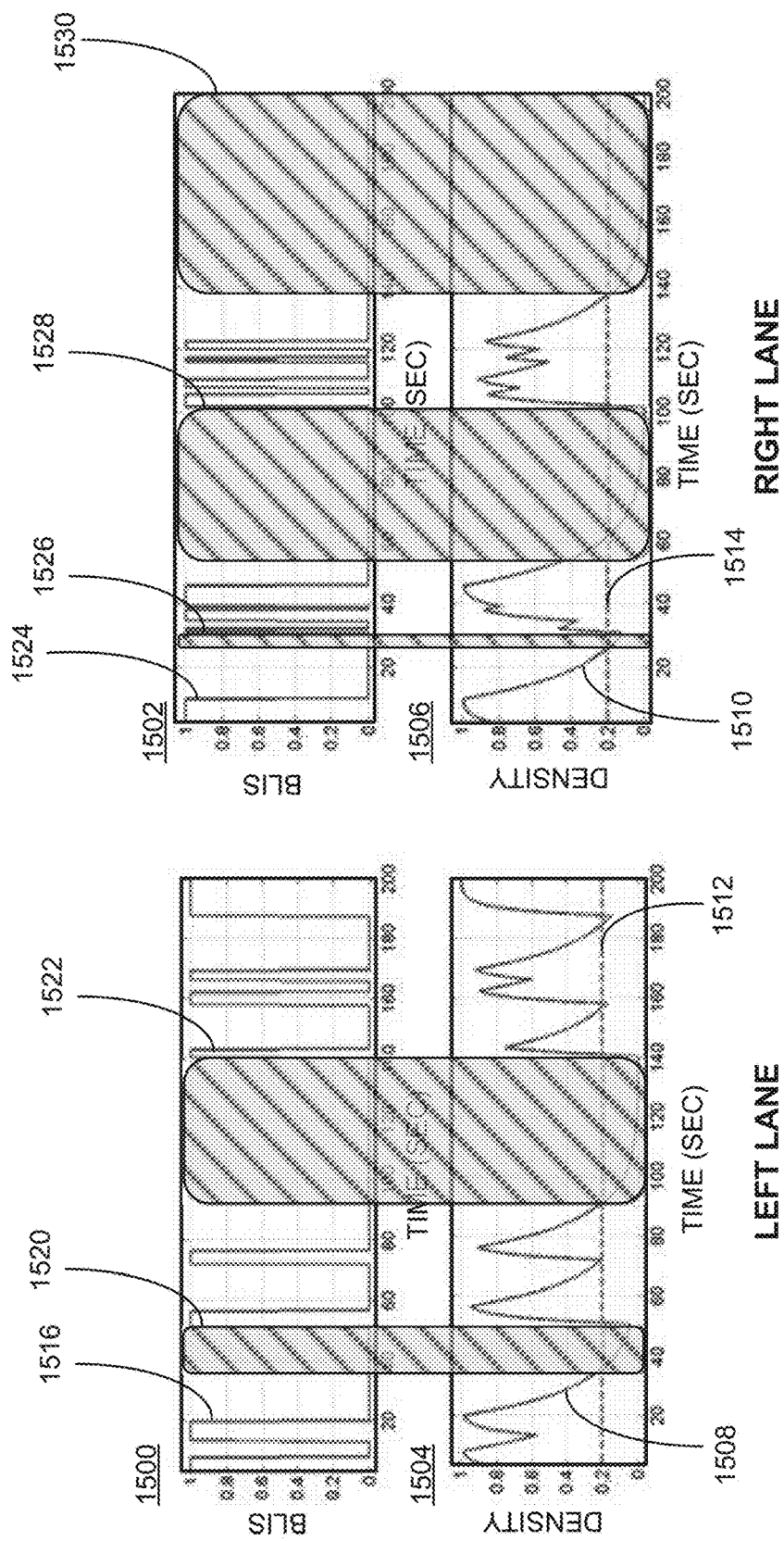
FIG. 15 is a diagram of example traffic density and blind spot signal graphs.

FIG. 15 is a diagram with four graphs including left lane blind spot signal 1500 (BLIS), left lane traffic density 1504 (DENSITY), right lane blind spot signal 1502 (BLIS), and right lane traffic density 1506 (DENSITY). Computing device 115 in vehicle 110 can use data from sensors 116 including video sensors, LIDAR sensors, radar sensors and ultrasonic sensors to determine traffic density 1504, 1508 for vehicle traffic in left and right adjacent traffic lanes, for example third vehicle 224 and fourth vehicle 226 in adjacent lane 220. Computing device 115 can use sensor 116 data to determine trajectories for adjacent lane vehicle traffic in regions of adjacent lanes known as "blind spots". Blind spots are regions of adjacent lanes that are not visible in vehicle 110 rear view mirrors or rear view video sensors, or visible in occupant's peripheral vision that can include vehicle traffic.

Left lane traffic density 1504 and right lane traffic density 1506 graph a measure of left lane traffic density 1508 and right lane traffic density 1510 vs. time in seconds. Left lane traffic density 1508 and right lane traffic density 1510 are determined by combining determined trajectories for adjacent lane vehicles to determine the total traffic density in adjacent lanes. Left lane blind spot signal 1502 and right lane blind spot signal 1504 graph a measure of the presence or absence of a vehicle in a blind spot. Left lane blind spot signal 1516 and right lane blind spot signal 1524 are outputs that equal 1 when a vehicle is determined to be in a blind spot in an adjacent lane and 0 when no vehicle is determined to be in a blind spot in an adjacent lane based on the left lane traffic density 1508 and right lane traffic density signal 1510, respectively. Left lane blind spot signal 1516 and right lane blind spot signal 1518 can be used to activate warning lights on left and right-hand rear view mirrors on vehicles 110, for example.

Left lane traffic density 1504 and right lane traffic density 1506 graphs also include lines 1512, 1514 that indicate when traffic density 1508, 1510 can be low enough to permit a lane change maneuver to be executed. This is indicated by shaded regions 1520, 1522, 1526, 1528, 1530 that show time periods of allowable traffic density for lane change maneuvers for adjacent left and right lanes. Computing device 115 can use this information to determine points p1 and p2 in traffic scene 200, for example, where the time period represented by the distance between points p1 and p2 can be determined to occur completely within a shaded region 1520, 1522, 1526, 1528, 1530 for the appropriate adjacent lane based on the direction of the lane change maneuver.

The time periods represented by shaded regions 1520, 1522, 1526, 1528, 1530 are time periods in which it is possible to execute a lane change maneuver, however, due to differences in traffic lane associated with an adjacent traffic lane 220 relative to a vehicle 206 current speed, some portions of the shaded regions 1520, 1522, 1526, 1528, 1530 can be unusable for lane change maneuvers. Computing device 115 can determine traffic lane speed for an adjacent lane 220 relative to vehicle 110 speed and determine when lane change maneuvers can be executed while staying within constraints on lateral and longitudinal accelerations and legal constraints on lane changing based on lane markings including lane divider 210, for example. Lane markings can be determined by computing device 115 using video sensors included in vehicle 110, for example, to determine when vehicle 110 can be allowed to execute a lane change maneuver by determining the number (single or double), color (yellow or white) and configuration (solid or dashed) of the lane divider 210, for example. Note that adjacent traffic lanes can be to the left or right of a current traffic lane 206, and traffic speed in adjacent traffic lanes can be faster or slower than the vehicle 110 current speed, wherein traffic lane speed is typically faster in left adjacent traffic lanes and slower in right adjacent traffic lanes.

Traffic lane speed for adjacent lanes can be determined by the on/off frequency of left lane blind spot signal 1516 and right lane blind spot signal 1518, for example. Computing device 115 can determine that lane change maneuvers can be executed by determining when a constant differential between current vehicle 110 speed and traffic lane speed for an adjacent lane is constant for a predetermined interval. Computing device 115 can also input data from a cross traffic alert sensor that alerts an occupant when traffic is approaching from the rear. Cross traffic alert sensors can alert an occupant when traffic is approaching perpendicular to the rear of vehicle 110, and are typically energized when vehicle 110 is in reverse. Cross traffic alert sensors can be used to detect other vehicles approaching a vehicle's blind spot and determine if it is in the right lane or left lane. This signal can be combined with right lane blind spot signal 1518 and left lane blind spot signal 1516 to determine when to execute lane change maneuvers.

Computing device 115 can combine adjacent lane traffic density, adjacent lane traffic speed and cross traffic alert sensor information with information from other sensors 116 including video sensors, radar sensors, and LIDAR sensors, for example, to determine optimal time periods in which to execute lane change maneuvers. Computing device 115 can display recommended time periods at which to execute lane change maneuvers to an occupant using prompts. Prompts are visual, audio, or haptic (touch) based outputs provided to an occupant of a vehicle 110 to elicit piloting behavior by the occupant.

Figure 7:
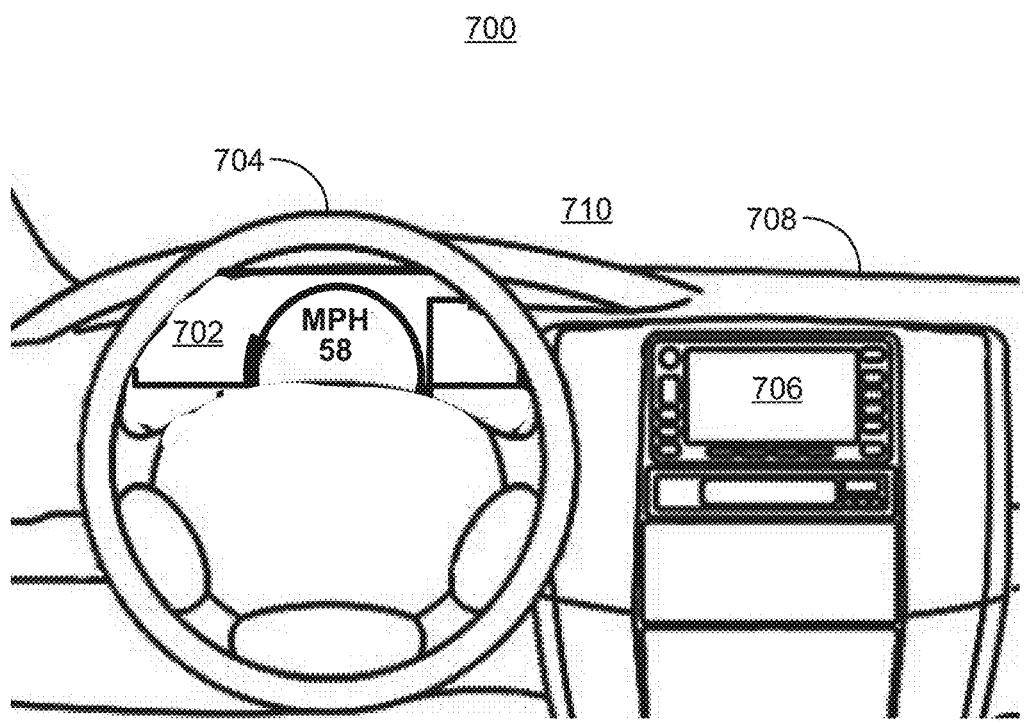
FIG. 7 is a diagram of an example vehicle interior with a prompt display.
Figure 12:
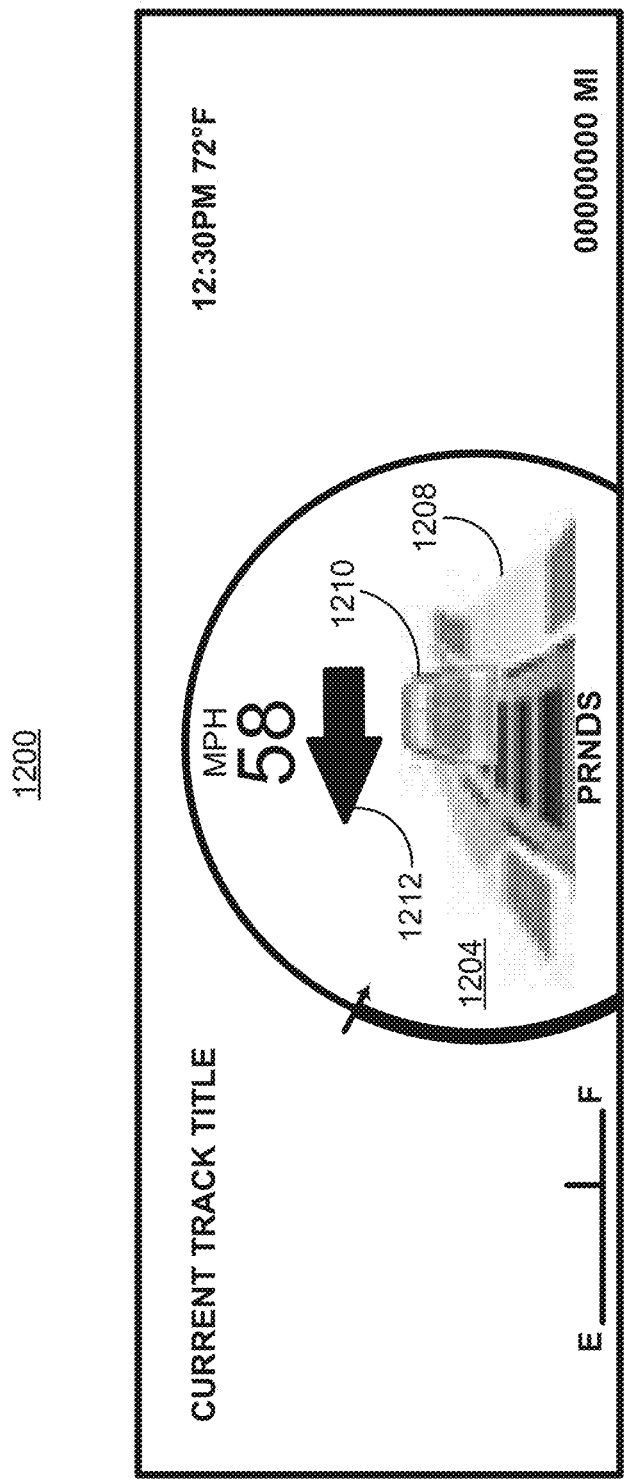
FIG. 12 is a diagram of an example vehicle prompt display.
Figure 13:
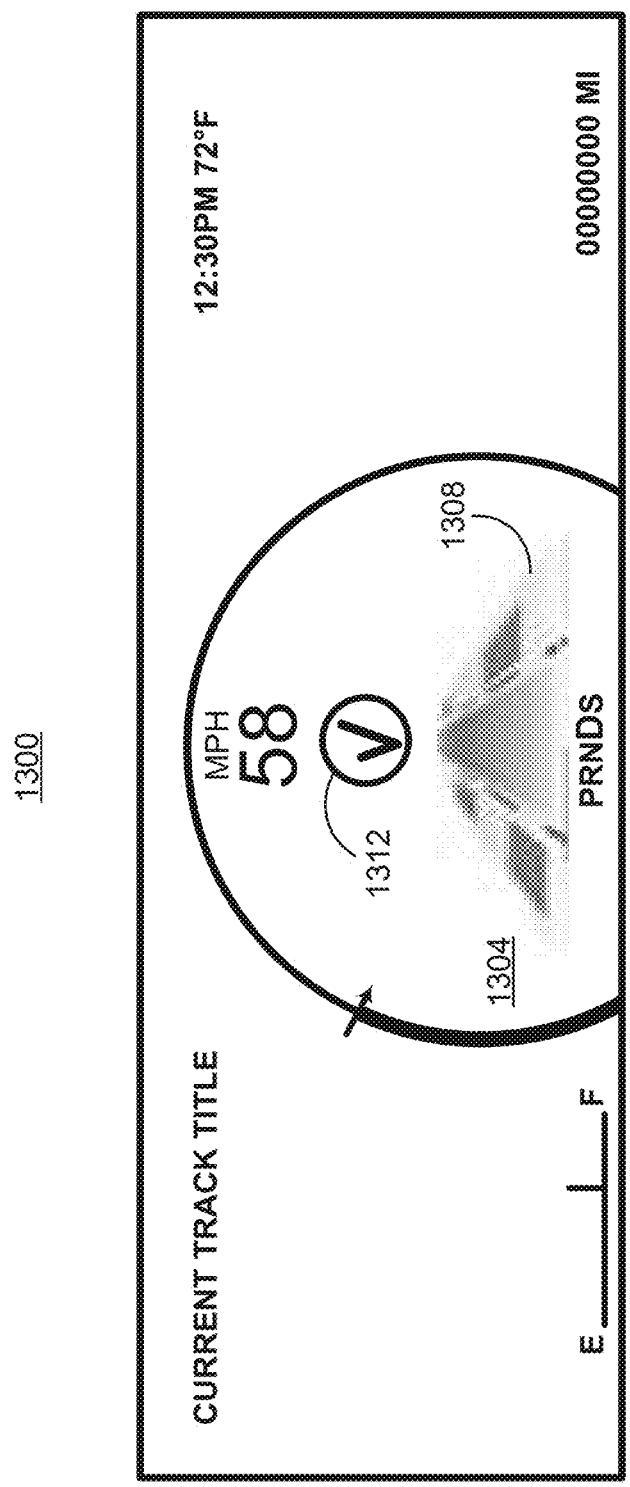
FIG. 13 is a diagram of an example vehicle prompt display.
Figure 14:
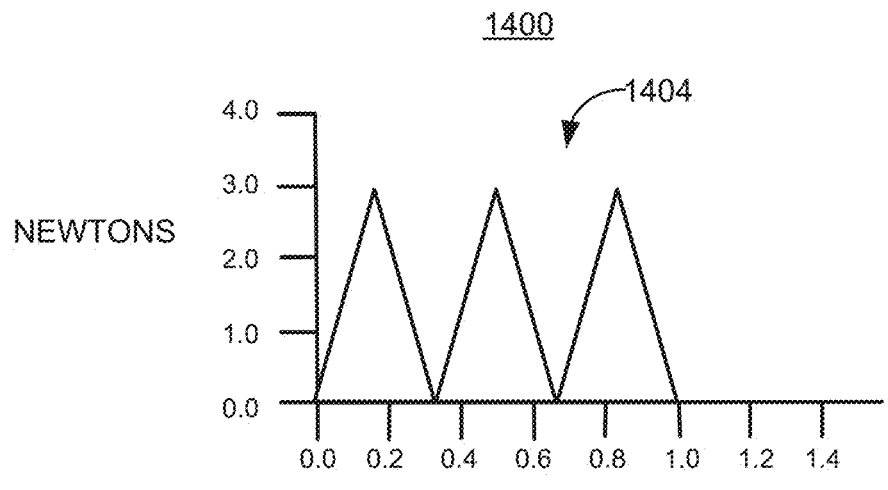
FIG. 14 is a diagram of example haptic output.
Figure 14:
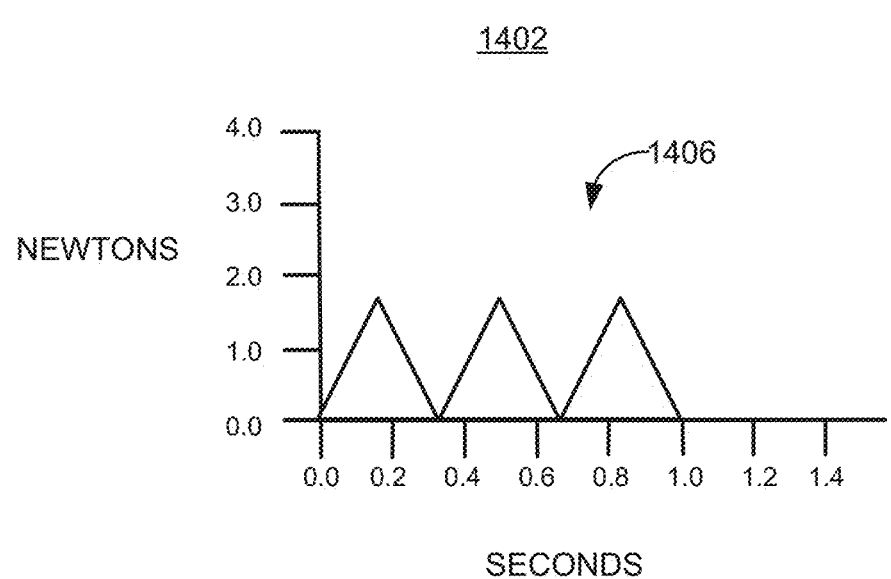
Figure 17:
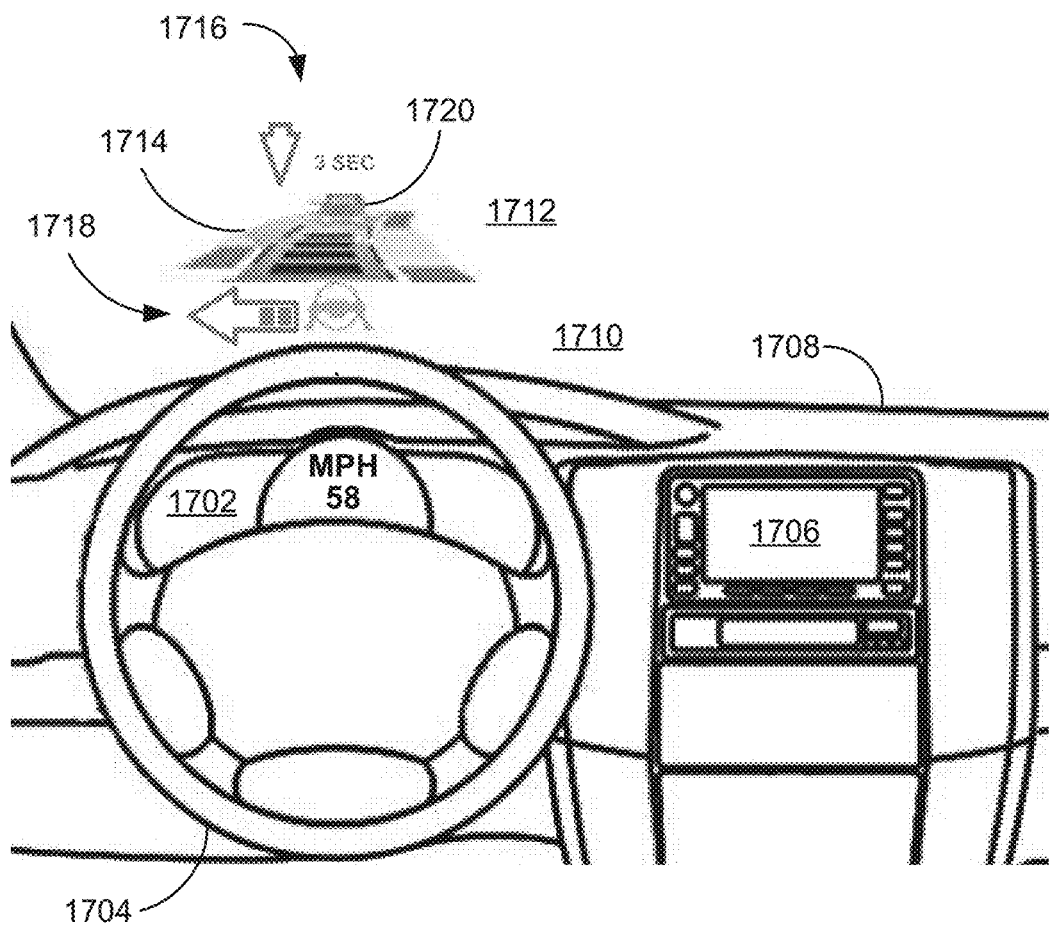
FIG. 17 is a diagram of a vehicle interior with a prompt heads up display.

Prompts can be presented to occupants to recommend lane change maneuvers including haptic output delivered via a steering wheel 704, 1700 as shown in FIGS. 7 and 17, with varying levels of perceived urgency as discussed in relation to FIG. 14, display prompts as discussed in relation to FIGS. 7-13, and audio alerts that can include audio cues with varying intensity and levels of perceived urgency, including synthetic human voices with warning phrases, for example. Perceived urgency can be defined as the level of urgency perceived by an occupant of a vehicle 110, in response to a prompt delivered via display prompts, haptic output, or audio cues. Perceived urgency can be associated with frequency, intensity, force, pattern, size or color and can be determined by psychophysical experimentation using driving simulation, for example.

Prompts presented to occupants of a vehicle 110 regarding lane change maneuvers as discussed above can be updated to reflect changes in vehicle traffic or road conditions that change the availability of virtual steerable path polynomials, for example. The prompts can also be updated to reflect occupant input in response to the prompt including canceling the prompt if it is not responded to by the occupant within a predetermined time limit. Computing device 115 can record the responses an occupant makes to various prompts and store the responses in non-volatile memory. The recorded response information can be used to form an occupant profile that can be used to determine which prompts computing device 115 might display to the occupant in the future.

Returning to FIG. 2, traffic scene 200 is represented at a current time step, where computing device 115 has determined a time to collision $t_c$ equal to the time it would take vehicle 110 can travel collision distance $X_0$ at the current trajectory to reach stopping distance d from parked vehicle 204. Computing device 115 can determine an estimated occupant reaction time $t_{RT}$, which can be the time required for an occupant to react to a prompt, for example. Occupant prompts are discussed below in relation to FIGS. 7-13. The estimated occupant reaction time $t_{RT}$ is represented in traffic scene 200 by the distance RT that vehicle 110 will travel during this time at current speed $V_0$. Thus, in traffic scene 200, the first opportunity for vehicle 110 to execute a lane change maneuver can be after vehicle 110 has traveled distance RT to reach point p1, since the average occupant will take that much time to react to a displayed prompt. Computing device 115 can determine a plurality of virtual steering path polynomials 216, 218 that begin at point p0 and depart from the steering path polynomial 214 starting at point p1 and thereafter depart from points on steerable path polynomial 214 until point p2, represented by the maneuvering distance, $X_m$. The maneuvering distance $X_m$ is the distance that vehicle 110 can travel during maneuver time $t_m$ at the current speed $V_0$. Virtual steering path polynomials 216, 218 and the area between them comprise a field of safe travel 228 for vehicle 110.

The field of safe travel 228 is an area within which computing device 115 can pilot a vehicle 110 to safely and comfortably execute a lane change maneuver represented by one of the plurality of virtual steerable path polynomials 216, 218 upon determining that the occupant intends to perform a lane change maneuver in response to a prompt. Computing device 115 can determine that an occupant intends to execute a lane change maneuver by receiving input from a steering wheel, for example, indicating the occupant intends to turn left or right by turning the steering wheel counter-clockwise or clockwise, respectively. As was discussed above, upon determining that the occupant intends to execute a lane change maneuver, when the vehicle 110 is between points p1 and p2 on steerable path polynomial 214, computing device 115 can perform a piloting assist and direct controllers 112, 113, 114 to pilot vehicle 110 onto one of the plurality of virtual steerable path polynomials 216, 218. In cases where the occupant does not indicate that a lane change maneuver is to be executed, after maneuver time $t_m$ expires at point p2, and vehicle 110 enters stopping time $t_s$, the time required to brake vehicle 110 safely and comfortably to a stop over stopping distance $X_s$, computing device 115 can assist piloting vehicle 110 by braking to a stop before reaching stopping distance d.

Virtual steerable path polynomials 216, 218 are steerable path polynomials 216, 218 that can be used by computing device 115 in control theoretic calculations to pilot vehicle 110 from a current traffic lane 206 to an adjacent traffic lane 220 but are not currently being used by computing device 115 to pilot vehicle 110. At some time during maneuver time $t_m$, upon determining an occupant's intention to execute a lane change maneuver in response to a prompt, computing device can perform a switch over from performing control theoretic calculations to control vehicle 110 based on steerable path polynomial 214 to performing control theoretic calculations to control vehicle 110 based on one of the plurality of virtual steerable path polynomials 214, 216. Recalling that control theoretic calculations can take several time periods to produce reliable output samples as discussed above, the plurality of virtual steerable path polynomials 214, 216 all begin by sharing a plurality of common vehicle trajectory values with steerable path polynomials 214. In this way, when the switch over occurs, the control theoretic calculations can be based on the same vehicle trajectory values and reliable samples can be output, uninterrupted by the switch over. The virtual steerable path polynomial 214, 216 selected for switch over can be a virtual steerable path polynomial 214, 216 that separates from steerable path polynomial 214 far enough in the future to permit computing device 115 to safely and comfortably pilot vehicle 110 to execute the lane change maneuver by controlling vehicle 110 based on the virtual path polynomial 214, 216.

Figure 3:
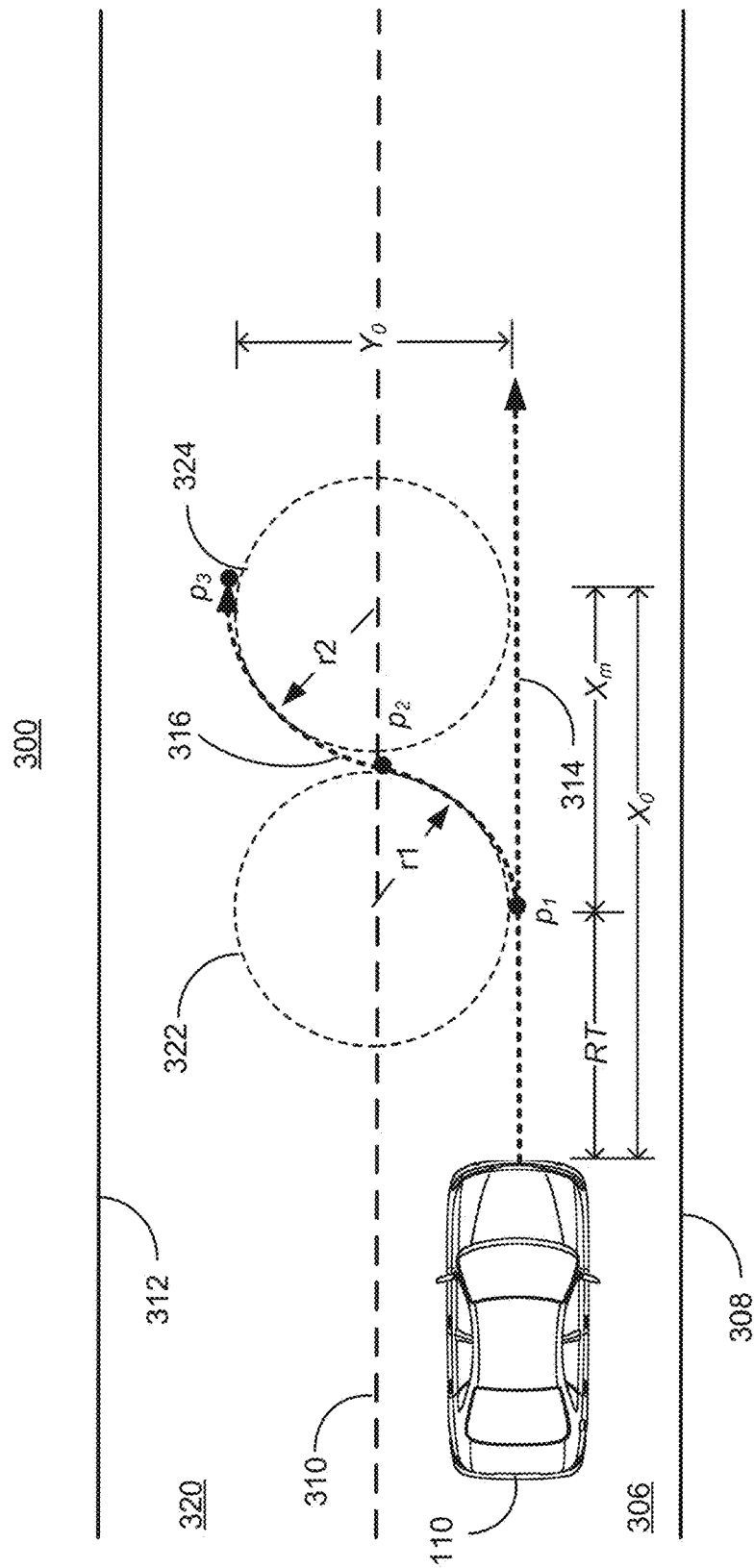
FIG. 3 is a diagram of an example traffic scene.

FIG. 3 is a diagram of a traffic scene 300, with a vehicle 110 being piloted in a traffic lane 306 defined by a right side marker 308 and a lane marker 310 based on steerable path polynomial 314. Traffic scene 300 includes a virtual steerable path polynomial 316, defined to start at a point p0 to coincide with steerable path polynomial 314 for a period of time, and then diverge from steerable path polynomial 314 at point p1 and end with a vehicle 110 trajectory in adjacent lane 320 defined by left side marker 312 and center marker 310 at a lane width distance $Y_0$ from steerable path polynomial 314 with at a direction consistent with adjacent lane 320 and with a speed consistent with adjacent lane 320 traffic.

Virtual steerable path polynomial 316 can include non-zero longitudinal and latitudinal accelerations. For example, a lane change maneuver can be accomplished by two time periods of non-zero latitudinal accelerations, the first during the time period from p1 to p2, where virtual steerable path polynomial 316 has a constant left lateral acceleration equal to $a_y$, the centripetal force generated on a mass equal to vehicle 110 by a circle with radius r1, then from p1 to p2 virtual steerable path polynomial 316 has right lateral acceleration equal to $a_y$, the centripetal force equal to the force generated on a mass equal to vehicle 110 by a circle with radius r2. At point p3 vehicle 110 has a trajectory parallel to and a lane width distance of $Y_0$ from steerable path polynomial 314, where $Y_0$=r1+r2. The lateral acceleration values and vehicle 110 speed combine to determine the maneuver distance $X_m$ and therefore the rate at which vehicle 110 executes a lane change maneuver. Combining lateral acceleration and speed is discussed in relation to in FIG. 4, below. Lateral acceleration values can have constraints determined by occupant comfort in addition to traction constraints as discussed in relation to traction circle 1600 in FIG. 16. High lateral acceleration can be uncomfortable to occupants and computing device 115 can be programmed to avoid high lateral and longitudinal acceleration values except in emergencies, where avoiding collision can depend upon high lateral or longitudinal acceleration or deceleration, for example.

In traffic scene 300, vehicle 110 is approaching a stopped vehicle or other object in traffic lane 306 at an initial speed $V_0$, with some initial distance represented by collision distance $X_0$ from a stopping distance d (forward collision warning onset) along a steerable path polynomial 314 from which a lane change maneuver can be determined. A virtual steerable path polynomial 316 can be determined to diverge from steerable path polynomial 314 at a point p1 following a determined estimated occupant reaction time $t_{RT}$, during which time vehicle 110 can travel a distance RT. Virtual steerable path polynomial 316 is based on the lane width distance $Y_0$ that vehicle 110 needs to move laterally to move into adjacent lane 320. The required lane change maneuver time $T_M$ depends on the peak lateral acceleration that can be applied and the lateral distance to be traversed (see below). This maneuver time is always subject to the limitation that the maneuver trajectory be carried out maintaining a comfortable distance from the vehicle ahead in the original travel lane. To illustrate the relationship between the lane change maneuver time and the longitudinal distance traveled, consider the following simplified example. Assuming a constant lateral acceleration, the required lane change maneuver time would be:

$$T_M = \sqrt{\frac{2Y_0}{a_y}}, \text{ since } Y_0 = \frac{1}{2}a_y T_M^2 \tag{1}$$

where the lane change maneuver occurs over a maneuver distance $X_M$, and a speed $V_0$ where:

$$X_M = T_M V_0 \tag{2}$$

Based on equation (1), the range of lane change maneuver times $T_M$ that can be achieved for steerable path polynomial 316 can be determined by the range of achievable lateral accelerations $a_y$. A vehicle 110 equipped with new tires on dry pavement can achieve a maximum lateral acceleration $a_y$ of about 1 gravity (g) or about 9.8 m/s² of acceleration, for example. In other cases, a vehicle 110 equipped with worn tires on wet pavement might only achieve 0.5 g of lateral acceleration before skidding, for example. The range of available lateral acceleration $a_y$ is also based on vehicle 110 braking, since application of braking torque produces (negative) longitudinal acceleration and total vehicle 110 acceleration is based on both latitudinal acceleration $a_y$ (steering) and longitudinal acceleration (braking). Thus, application of braking torque can make less lateral acceleration $a_y$ available and thereby increase lane change maneuver time $T_M$, for example.

For example, in a traffic scene 300, vehicle 110 can avoid a stopped vehicle by braking, steering or a combination of braking and steering. In cases where an occupant is piloting vehicle 110, an occupant will generally brake, even when steering alone would have avoided a stopped vehicle and more closely maintained a target speed, for example. Computing device 115 can assist occupant in piloting vehicle 110 by executing a lane change maneuver to avoid a stopped vehicle. Computing device 115 can determine a steerable path polynomial 316 based on the available lateral acceleration $a_y$. The available lateral acceleration a can be based on determining longitudinal acceleration due to braking by the occupant, for example.

Figure 16:
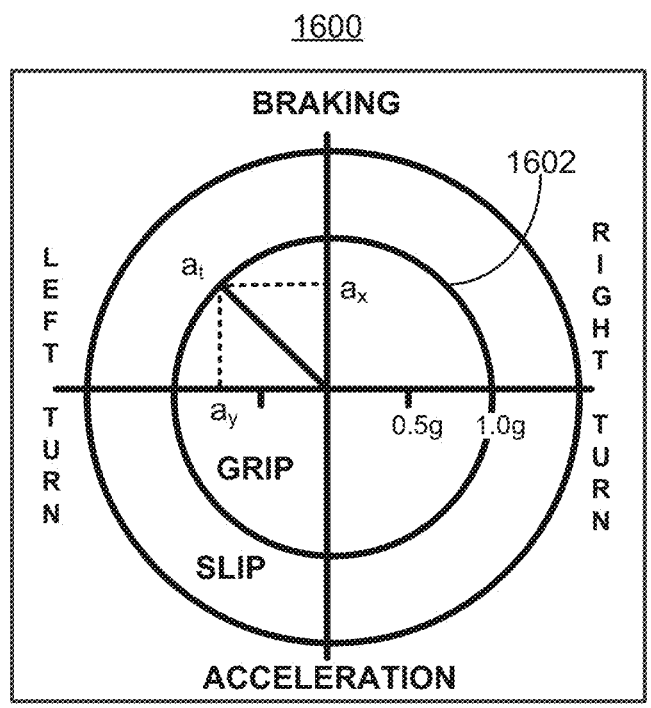
FIG. 16 is a diagram of an example traction circle.

FIG. 16 is a diagram of a friction circle 1600, wherein lateral acceleration $a_y$ and longitudinal acceleration $a_x$ due to braking and steering can be graphed according to their values. Friction circle 1600 shows a nominal net down force of acceleration due to gravity=1 g=9.8 m/s² or 32 ft/s², operating on vehicle 110, for example. The relationship between lateral and longitudinal accelerations is given by the Pythagorean theorem:

$$g = \sqrt{a_x^2 + a_y^2} \quad (3)$$

where the combined acceleration g can be graphed on a friction circle 1600, as shown in FIG. 16, where g is graphed as a distance between the center of the braking/acceleration axis and the left turn/right turn axis and a 1 g circle 1602 representing 1 g of combined acceleration. A combined lateral and longitudinal acceleration resulting in 1 g of downforce represents what might be achievable under ideal conditions. In general, the friction circle will have a smaller radius on slick roads, with worn tires, etc. The coefficient of friction μ can be added to capture these reductions in friction:

$$\mu a_t = \sqrt{a_x^2 + a_y^2} \quad (4)$$

Based on these equations, lateral and longitudinal accelerations can be traded off within the limits of tire adhesion. Maximum braking is achieved when there is no turning or steering, for example. Likewise, maximum lateral acceleration is achieved when there is no concurrent braking or acceleration. Within the 1 g circle 1602 on the friction circle 1600, vehicle 110 tires will maintain a grip on the road for any combination of lateral or longitudinal acceleration. Outside of the circle, vehicle 110 tires will skid, which can lead to loss of control of the vehicle 110. The available lateral acceleration can be calculated by the equation:

$$a_y = \sqrt{(\mu a_t)^2 - a_x^2} \quad (5)$$

The trade-off between lateral acceleration $a_y$ and longitudinal acceleration $a_x$ can be graphically displayed on a friction circle 1600 and summarized in Table 1, which lists nine different combinations of lateral acceleration $a_y$ and longitudinal acceleration $a_x$ that combine to form 1 g of downforce.

TABLE 1

Longitudinal and Lateral Acceleration trade-off

| Longitudinal Acceleration | Lateral Acceleration | Total Acceleration |
| --- | --- | --- |
| 0 | 1 | 1.0 |
| 0.3 | 0.95 | 1.0 |
| 0.4 | 0.92 | 1.0 |
| 0.5 | 0.86 | 1.0 |
| 0.6 | 0.8 | 1.0 |
| 0.7 | 0.71 | 1.0 |
| 0.8 | 0.6 | 1.0 |
| 0.9 | 0.45 | 1.0 |
| 1 | 0 | 1.0 |

Available versus required lateral acceleration can be determined based on one or more lane change maneuver profiles modeled as a sine function of time, t, by the equation:

$$a_y = A \sin \omega t = \frac{2\pi Y_0}{T_m^2} \sin\left(\frac{2\pi}{T_m} t\right) \quad (9)$$

where lateral acceleration $a_y$ is a sine function of time, t, intended lane change distance $Y_0$, and lane change maneuver time $T_m$. Equation (9), when integrated with respect to time, provides a cosine function of time, t, for lateral velocity:

$$v = \frac{Y_0}{T_m}\left[1 - \cos\left(\frac{2\pi}{T_m} t\right)\right] + v_0 \quad (10)$$

where $v_0$ is an initial velocity. Integration of velocity with respect to time provides a formula for lateral displacement s:

$$s = \frac{Y_0}{T_m} t - \frac{Y_0}{T_m} \sin\left(\frac{2\pi}{T_m} t\right) + v_0 t + d_0 \quad (11)$$

where $d_0$ is an initial displacement. This lateral displacement function can represent a lane change maneuver as represented by one or more steerable path polynomials 216-218, for example, and therefore can be used to determine a field of safe travel 228.

Available lateral acceleration $a_y$ can be included in real time prompt displays 702, 1702, which can display a field of safe travel 228 based on maximum achievable lateral acceleration $a_y$, either mounted in a vehicle 110 dashboard 708 or projected as a heads-up-display (HUD) 1716 on a vehicle 110 windshield 1712 as described in relation to FIGS. 7-13 and 17. The field of safe travel 228 can be based on lane change maneuvers, modeled, to a first approximation, as a sine function of time, t, for lateral acceleration $a_y$ as shown in equation (9), above, where peak lateral acceleration $$\left(A = \frac{2\pi Y_0}{T_m^2}\right)$$

is a function of two factors. One is the intended lane change distance $Y_0$, or lateral distance from the original travel lane to the destination lane. The other factor is the (square of the) lane change maneuver time ($T_m$) or maneuver completion time. Peak acceleration can be, in turn, determined by the friction circle 1600, which can also be called a traction circle. As an example, if the coefficient of friction (μ) between the road and the tires is 0.7 and there is no braking, the available peak lateral acceleration is 0.7 g or 6.86 m/s². On the other hand, wet pavement or a combination of braking and steering might reduce the available peak lateral acceleration to 0.3 g or even less when combined with deceleration or acceleration.

Terms in the peak lateral acceleration formula can be rearranged in the formula for A to determine the squared lane change completion time given a specific intended lane change distance $Y_0$. For example, assume a peak lateral acceleration available of 0.25 g (1.96 m/s²) and $Y_0$=3.66 m (i.e., 12 ft. lateral shift between the center of one lane and the center of the adjacent lane). Then the required lane change completion time can be calculated as 3.06 s (9.39 s²). Given that the lane change maneuver time must be sufficient to complete the maneuver within the distance remaining to safely and comfortably pass a lead vehicle, the peak lateral acceleration achievable can be used to determine the latest point at which the maneuver may begin and the resulting geometry of the trajectory which may be displayed as a field of safe travel 228.

Figure 4:
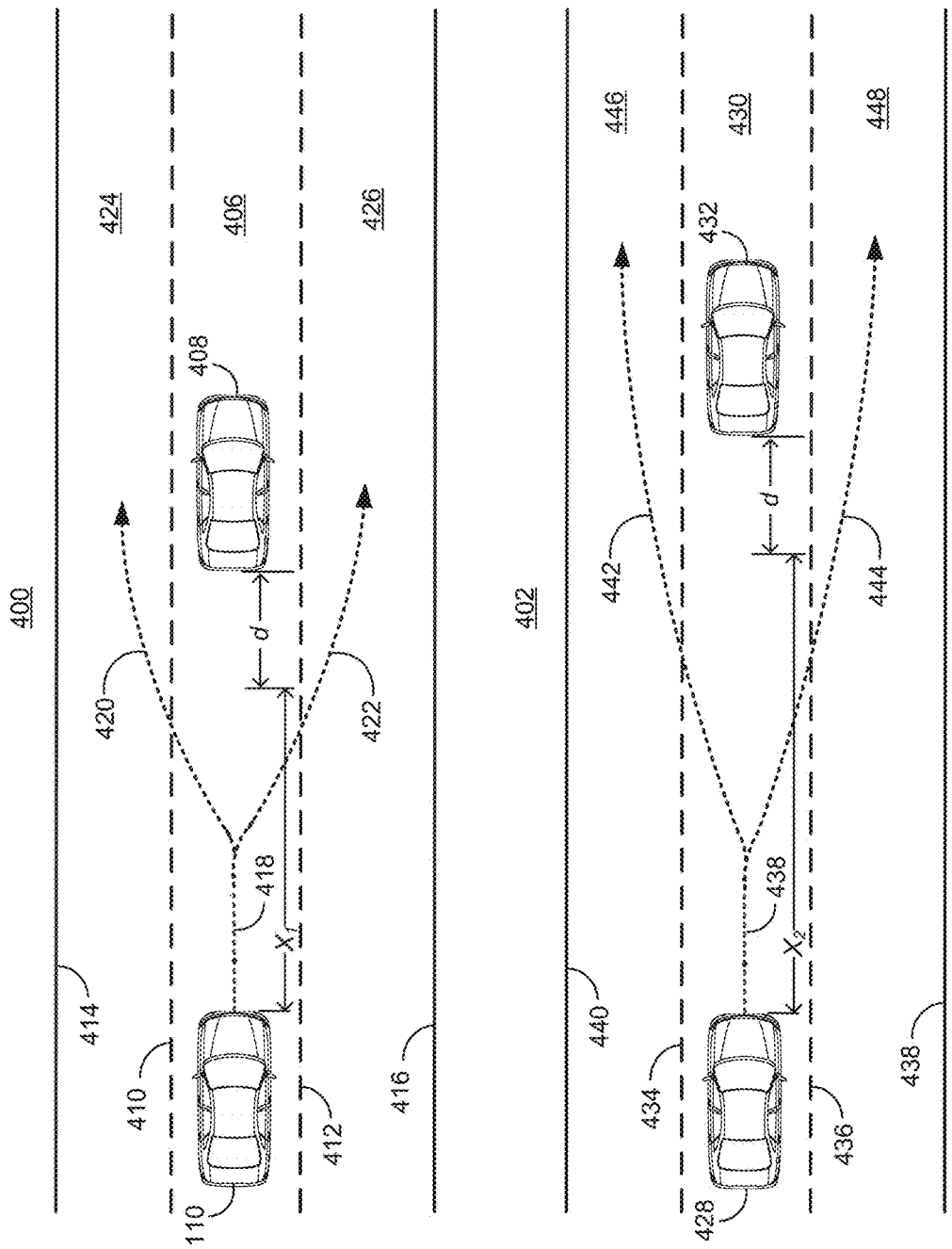
FIG. 4 is a diagram of two example traffic scenes.

FIG. 4 is a diagram of two traffic scenes 400, 402. Traffic scene 400 includes a vehicle 110 traveling in a lane 406 defined by lane markers 410, 412 along steerable path polynomial 418. Traffic scene 400 includes virtual steerable path polynomials 420, 422 that represent lane change maneuvers to adjacent lanes 424, 426, defined by left side marker 414, lane markers 410, 412 and right side marker 416, respectively. The lateral acceleration values used to determine virtual steerable path polynomials 420, 422 can be based on target values determined by the speed of vehicle 110 and predetermined constraints to maintain a distance d between a second vehicle 408 and vehicle 110. The distance $X_1$ represents the estimated occupant reaction time distance RT plus the maneuver time distance $X_m$ and braking time distance $X_s$ as discussed in relation to FIG. 2, above.

In traffic scene 402, vehicle 428 is traveling in a lane 430 defined by lane markers 434, 436 along steerable path polynomial 438. Traffic scene 402 includes virtual steerable path polynomials 442, 444 that represent lane change maneuvers to adjacent lanes 446, 448, defined by left side marker 440, lane markers 434, 436, and right side marker 450, respectively. In this case, the lateral acceleration values used to determine virtual steerable path polynomials 442, 444 can be the same as in traffic scene 400, however, since the speed of vehicle 428 is greater than the speed of vehicle 110, distance $X_2$, required to keep clear of vehicle 432 is greater than distance $X_1$ in traffic scene 400.

Figure 5:
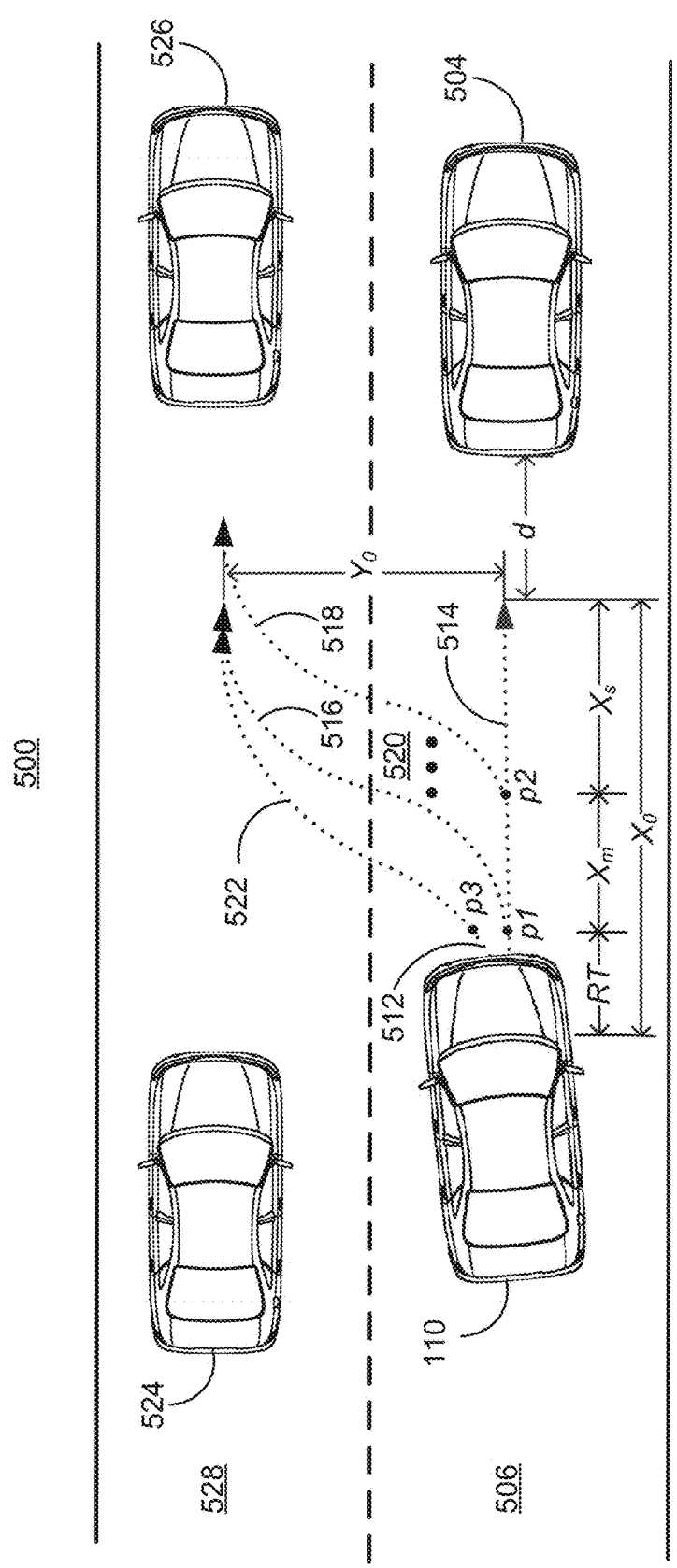
FIG. 5 is a diagram of an example traffic scene.

FIG. 5 is a diagram of a traffic scene 500. As in traffic scene 200 in FIG. 2, computing device 115 has determined steerable path polynomial 514 and virtual steerable path polynomials 516, 518 which form a field of safe travel 520, indicated by the ellipsis (i.e., the three dots), distances RT, $X_m$, $X_s$, and $X_0$, and points p1 and p2, at an initial time step at which time a prompt is displayed to an occupant. At a time step following the initial time step, vehicle 110 can have a trajectory that places vehicle 110 in the position shown in traffic scene 500 where vehicle 110 is no longer being piloted along steerable path polynomial 514, and computing device 115 can therefore no longer rely on steerable path polynomial 514 for piloting. This can be caused by normal operation of the vehicle 110 being piloted by occupant input on a steering wheel, for example, or caused by error in controlling vehicle 110 by computing device 115 or caused by a natural force acting on the vehicle 110, such as a crosswind, or a roadway hazard such as a pothole.

In this case, computing device 115 can update the steerable path polynomial 514 and virtual steerable path polynomials 516, 518 to permit computing device to continuously produce reliable trajectory updates. Computing device 115 can update the steerable path polynomial 514 with an updated steerable path polynomial 512 and virtual steerable path polynomials 516, 518 with an updated virtual steerable path polynomial 522, for example including a new point p3 that indicates when control theoretic calculations can switch over from the updated steerable path polynomial 512 to the updated virtual steerable path polynomial 522. Computing device 115 can also update the field of safe travel 520 to include updated steerable path polynomial 522 and delete virtual steerable path polynomials 516, 518 that may no longer be achievable by vehicle 110. By updating the steerable path polynomial 512 and the virtual steerable path polynomial 522, computing device 115 can output trajectory updates with high reliability without interruption when switching from updated steerable path polynomial 514 to updated steerable path polynomial 522. Computing device can also update the prompt displayed for occupant input including an updated field of safe travel 520.

Figure 6:
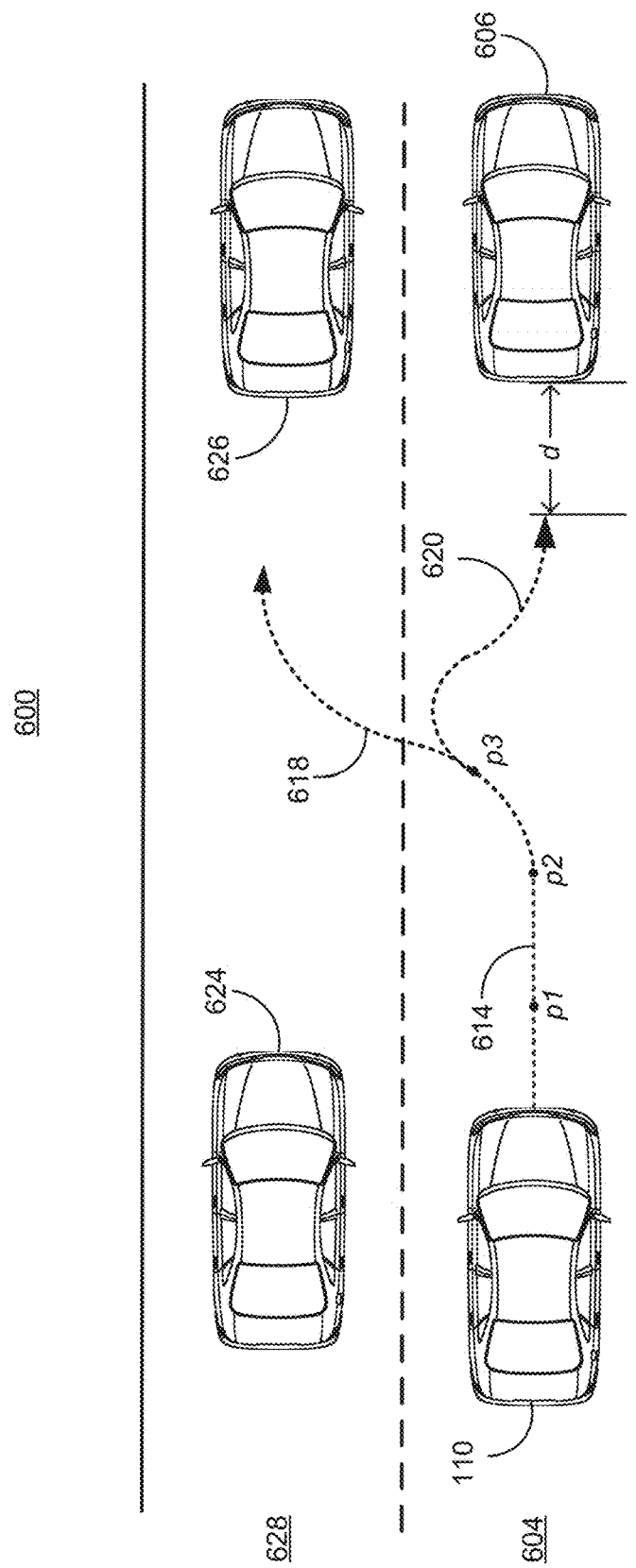
FIG. 6 is a diagram of an example traffic scene.

FIG. 6 is a diagram of a traffic scene 600 showing an example of virtual steering path polynomial 618 updating based on input by an occupant. In traffic scene 600, a vehicle 110 can be piloted in a traffic lane 604. A computing device 115 in vehicle 110 can determine a steerable path polynomial 614 and a virtual steerable path polynomial 618 starting at the time represented by point p1. At a time represented by the point p2, computing device 115 can switch over from steerable path polynomial 614 to virtual steerable path polynomial 618 as discussed above in relation to FIG. 2. At a time represented by point p3, computing device 115 can determine that piloting vehicle 110 along virtual steerable path polynomial 618 is no longer the best path along which to steer, for example. This can be as a result of input from an occupant of vehicle 606, for example, applying rotational force, or torque, to a steering wheel in a direction counter to the direction that the vehicle 606 is currently steering along virtual steering path polynomial 618, indicating an intent to cancel the lane change maneuver represented by virtual steerable path polynomial 618.

In this case, computing device 115 can determine that, if sufficient distance remains to stop vehicle 110 before reaching stopping distance d behind second vehicle 606, a virtual steerable path polynomial 620 can be determined by inverting portions of virtual path polynomial 618 to return vehicle 110 to a trajectory in traffic lane 604, including switching over from virtual steerable path polynomial 618 to virtual steerable path polynomial 620, and piloting vehicle along virtual steerable path polynomial 620 including braking to a stop behind second vehicle 606.

In other cases, an occupant can input an intention to cancel a lane change maneuver based on the occupant perceiving vehicle 606 accelerating or turning out of traffic lane 604 to remove vehicle 606 and stopping distance d from traffic scene 600, for example. In these cases, virtual steerable path polynomial 620 can return vehicle 110 to a trajectory included in steerable path polynomial 614 with updated position in traffic lane 604, without braking to a stop, by inverting portions of virtual steerable path polynomial 618 to create virtual steerable path polynomial 620 and piloting vehicle 110 along virtual steerable path polynomial 620 at the speed and direction originally piloted on steerable path polynomial 614.

In other cases, canceling a lane change maneuver can be caused by changes in traffic in adjacent lane 628 that occur after computing device has switched over from steerable path polynomial 614 to virtual steerable path polynomial 618 following point p2, but before the lane change maneuver is complete at point p4. For example, computing device 115 can determine that the virtual steerable path polynomial 618 is no longer a good path to steer due to changes in adjacent lane 628 traffic, including changes in trajectories of third vehicle 624 and/or fourth vehicle 626. For example, changes in the trajectories of third vehicle 624 and/or fourth vehicle 626 determined by computing device 115 via sensors 116 while piloting vehicle 110 along virtual steerable path polynomial 618 can cause computing device 115 to determine that continuing to pilot vehicle 110 along virtual steerable path polynomial 618 would cause a collision with third vehicle 624 or fourth vehicle 626, or cause vehicle 110 to assume a position in adjacent lane 628 that was closer to third vehicle 624 or fourth vehicle 626 than predetermined limits. As with other lane change maneuvers discussed above in relation to FIGS. 2-5, canceling a lane change maneuver can be understood symmetrically with respect to adjacent right lanes and adjacent left lanes and with adjacent lane traffic that is slower or faster than vehicle 110.

FIG. 7 is a diagram of an interior portion of a vehicle 700, looking forward. Vehicle interior 700 includes a prompt display 702, a steering wheel 704, an occupant control interface 706, a dashboard 708 to house or support the prompt display 702, steering wheel 704, and a windshield 710. The prompt display 702 can be a programmable color display situated in front of an occupant in position to pilot a vehicle, behind and visible through a steering wheel 704, for example. The prompt display 702 can be used to display information and prompts regarding vehicle 700 piloting based on a field of safe travel 520. FIGS. 8-13 are detailed diagrams of prompt display 702 showing prompts that can be displayed as vehicle 700 executes a lane change maneuver, for example.

In addition to or instead of a prompt display 702, a vehicle 1700 can include a prompt heads up display (HUD) 1712 as shown in FIG. 17, to display prompts to an occupant. FIG. 17 is a diagram of an interior of a vehicle 1700, looking forward. Vehicle interior 1700 includes a prompt display 1702, a steering wheel 1704, an occupant control interface 1706, a dashboard 1708 and a windshield 1710 upon which computing device 115 can project a prompt heads up display (HUD) 1712. Prompt HUD 1712 can provide the same information to an occupant as shown in FIGS. 8-13, for example, by displaying a field of safe travel 1714, a path prompt 1716 depicting a future position for vehicle 1700 and a maneuver time, and a steering prompt 1718 depicting the direction to steer with time indicators, for example. In addition, since prompt HUD 1712 is projected onto windshield 1710 so as to permit normal vision of the real world through windshield 1710, a real vehicle 1720 can be seen through windshield 1710 and prompt HUD 1712. Prompt HUD 1712 can combine information regarding a field of safe travel 1714 with the future position of vehicle 1700 to provide a clear indication to an occupant of the best direction to pilot vehicle 1700, or, in cases where computing device 115 is piloting vehicle 1700, where computing device 115 is planning on piloting vehicle 1700. This can be important in cases where a collision is imminent, for example, to permit occupant to see computing device 115 predict a safe path for vehicle 1700 as the lane change maneuver is being executed.

Figure 8:
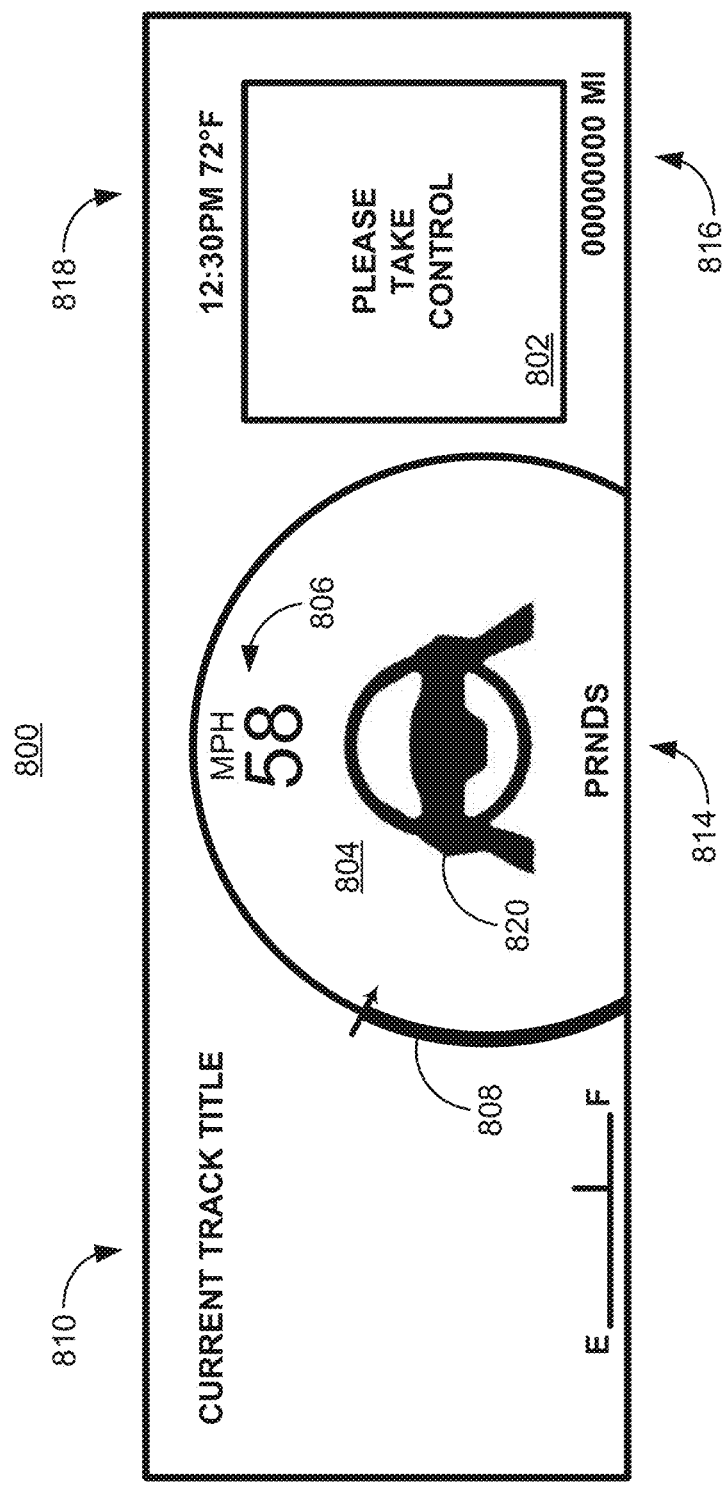
FIG. 8 is a diagram of an example vehicle prompt display.

FIGS. 8-13 are diagrams of a prompt display 800, 900, 1000, 1100, 1200, 1300 depicting changes in the display that can occur while executing a lane change maneuver, for example. FIG. 8 is a diagram of a prompt display 800, with a message area 802, a prompt area 804, a digital speed display 806, an analog speed display 808, an entertainment system display 810, a fuel display 812, a powertrain display 814, an odometer display 816, and a time and temperature display 818. As prompt display 800 is displayed, a vehicle 110 can be in autonomous or occupant assist mode, where a computing device 115 can pilot vehicle 110 for time periods without input from an occupant, or the vehicle 110 may be piloted by an occupant. In prompt display 800 the message area 802 includes the message "PLEASE TAKE CONTROL", directing an occupant to begin piloting the vehicle 110 if they are not already piloting vehicle 110. This message is reinforced by a steering wheel icon 820 displayed in the prompt area 804. Computing device 115 can prompt an occupant to take control of a vehicle 110 after determining that a lane change maneuver is required to maintain a predetermined speed. For example, an occupant can predetermined a speed using an adaptive speed control program in computing device 115 that attempts to maintain a constant vehicle speed ("cruise control").

Figure 9:
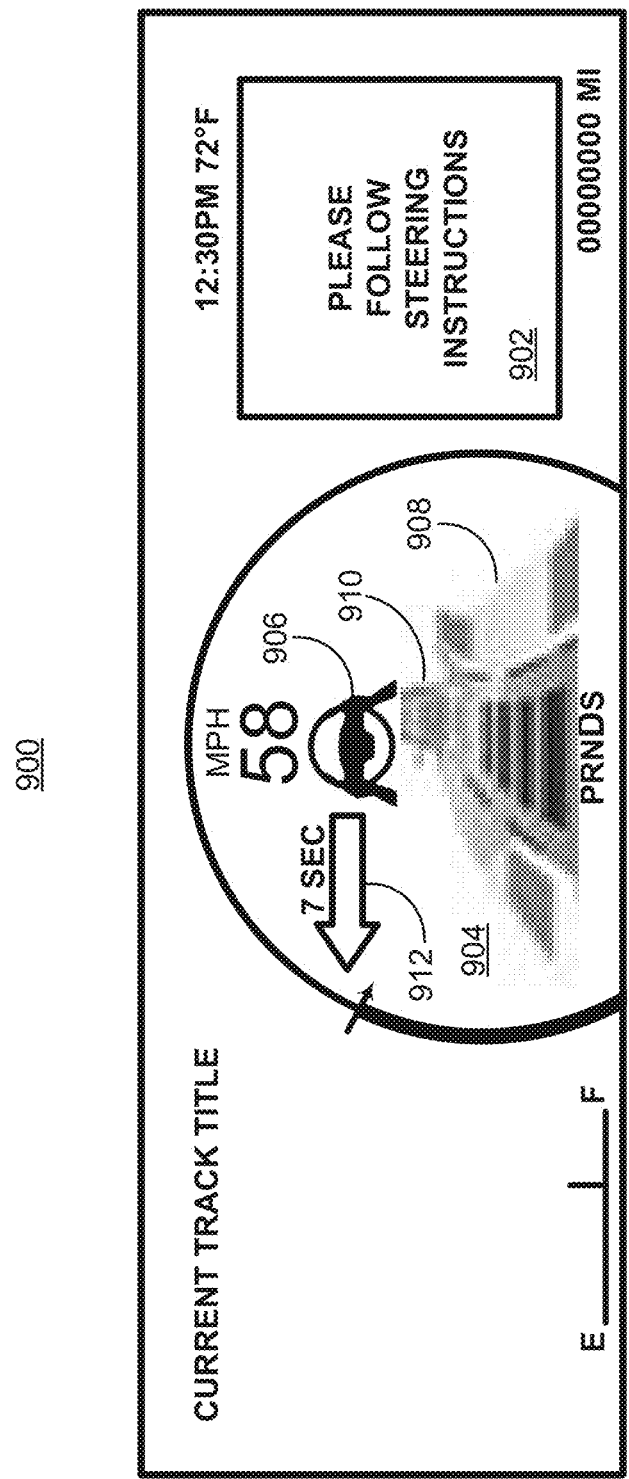
FIG. 9 is a diagram of an example vehicle prompt display.

FIG. 9 is a diagram of a prompt display 900, wherein the message display 902 includes the message "PLEASE FOLLOW STEERING INSTRUCIONS", directing the occupant to follow the instructions displayed in prompt area 904. Prompt area 904 includes a steering wheel icon 906 reminding an occupant that computing device 115 has determined that an occupant should be piloting vehicle 110 and a field of safe travel display 908 including a vehicle icon 910 and an arrow icon 912 with a legend describing the number of seconds remaining before the end of maneuver time $t_m$ and the beginning of stopping time $t_s$ as discussed in relation to FIG. 2, for example. The field of safe travel display 908 includes display elements that direct an occupant to steer vehicle 110 safely and comfortably through a lane change maneuver using color graphics.

Figure 10:
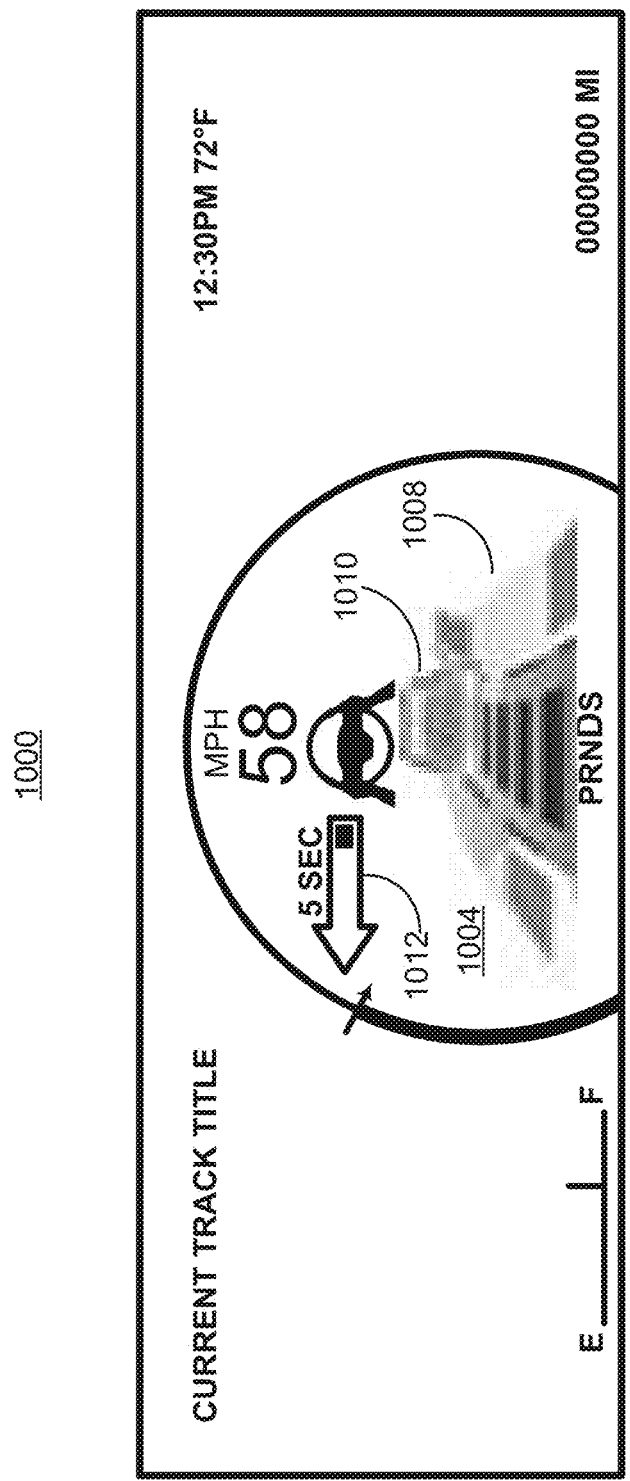
FIG. 10 is a diagram of an example vehicle prompt display.
Figure 11:
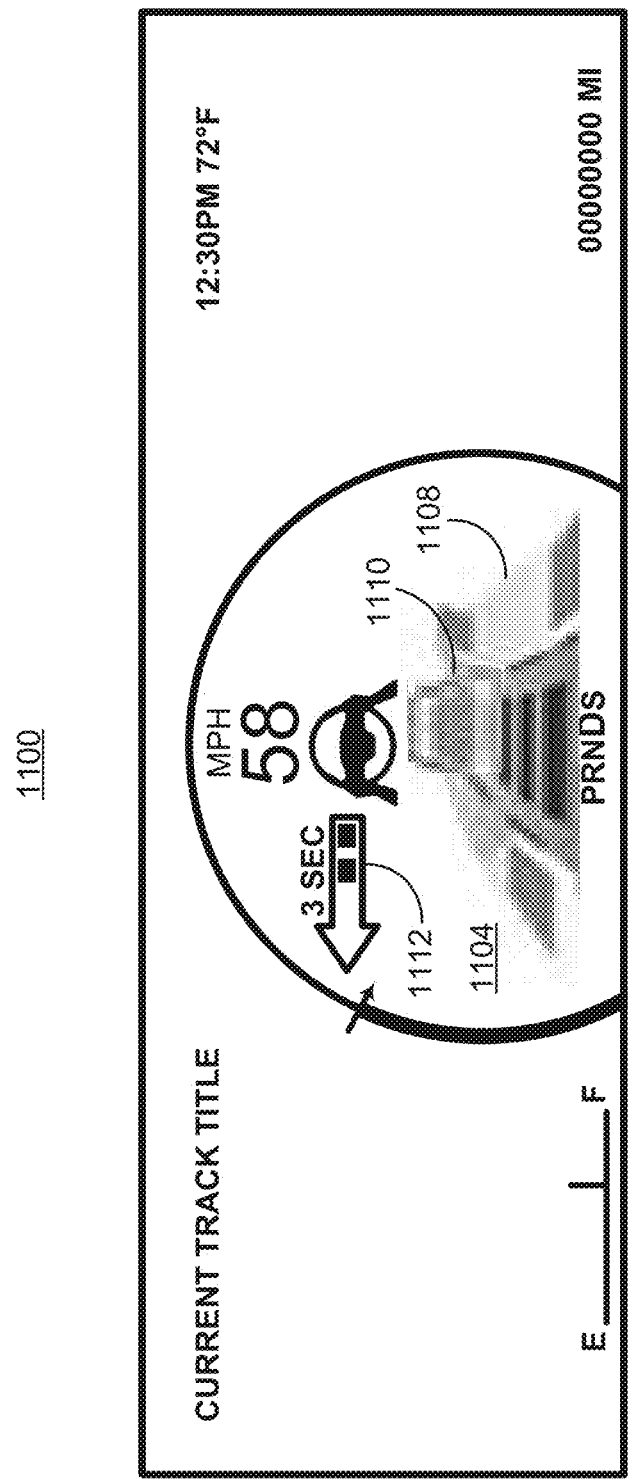
FIG. 11 is a diagram of an example vehicle prompt display.

FIG. 10 is a diagram of a prompt display 1000, wherein the prompt area 1004 includes the field of safe travel display 1008 including vehicle icon 1010. In this case, field of safe travel display 1008 communicates the timing with which an occupant should execute a lane change maneuver by rendering the vehicle icon 1010 larger in comparison with field of safe travel display 1008, and by annotating arrow icon 1012 with a time passage indicator (black bar) and a legend noting 5 seconds left until the end of maneuver time $t_m$, for example. FIG. 11 is a diagram of a prompt display 1100, wherein the prompt area 1104 includes the field of safe travel display 1108 including a vehicle icon 1110 rendered yet larger in comparison with field of safe travel display 1108, and an arrow icon 1112 with two time passage indicators (two dark bars) and a legend noting 3 seconds left until the end of maneuver time $t_m$, thereby indicating even more perceived urgency in executing a lane change maneuver than prompt display 1000.

FIG. 12 is a diagram of a prompt display 1200 wherein the time left until the end of maneuver distance is less than 3 seconds, and wherein the prompt area 1204 includes the field of safe travel display 1208 including a vehicle icon 1210, rendered much larger in comparison with field of safe travel display 1208, and a large arrow icon 1212 that can be rendered in a color such as red and made to flash denote urgency, for example. This prompt display 1200 can represent a last prompt display that would solicit occupant input. If an occupant did not respond to prompt displays 800, 900, 1000, 1100, 1200, computing device 115 can cancel the prompt and no longer be prepared to receive an occupant input, for example, and continue to be piloted in the current mode. Computing device 115 can wait until the next opportunity to execute a lane change maneuver arises, as discussed in relation to FIG. 15, below, or, in other cases, assume control and brake vehicle 110 to a stop, for example. FIG. 13 is a diagram of a prompt display 1300 shown after the successful completion of the lane change maneuver, or after canceling the lane change maneuver. The prompt area 1304 includes a field of safe travel 1308 with no vehicle icon depicting a clear traffic lane ahead and a check-mark icon 1312 to denote a successful maneuver.

Returning to FIG. 7, steering wheel 704 can also be used by computing device 115 to prompt an occupant to execute a lane change maneuver by producing a haptic output on steering wheel 704 to prompt an occupant to execute a lane change maneuver or indicate an intent to execute a lane change maneuver. Haptic output refers to information output to an occupant via the sense of touch. Haptic output can be produced by applying force to an object being touched by an occupant, in this case torque or rotary force applied to a vehicle 110 steering wheel 704. Haptic output can be used in combination with visual prompts as discussed in relation to FIGS. 8-13 above. For example, visual prompts can direct an occupant to place their hands on the steering wheel to permit haptic output to be perceived by the occupant. Haptic output can be applied to a steering wheel 704 by applying rotary force or torque to the steering wheel 704 via an electric motor, for example. Haptic output can indicate a direction to steer by applying clockwise or counter-clockwise torque to the steering wheel 704, where clockwise torque indicates steer right and counter-clockwise torque indicates steer left.

FIG. 14 shows two graphs 1400, 1402 of patterns of haptic output, graphed as force in newtons vs. time in seconds. The first graph 1400 shows a first pattern 1404 of three pulses of 3.0 newtons delivered over a 1.0 second period as rotational force or torque on a steering wheel 704, 1704. The second graph 1402 shows a second pattern 1406 of three pulses of 1.5 newtons delivered over a 1.0 second period as rotational force or torque on a steering wheel 704, 1704. The rotational force or torque can be delivered to the steering wheel 704, 1704 via an electrical actuator, for example a motor or solenoid, operatively connected to the steering wheel 704, 1704 and operating under the control of computing device 115. The first pattern 1404 can be perceived by occupants as more urgent than the second pattern 1406, for example. Occupants can perceive up to ten levels of urgency as represented by patterns of haptic output pulses.

One or more patterns of a plurality of patterns of haptic output pulses can be perceived by vehicle 110 occupants to be low urgency haptic outputs and one or more patterns of haptic output pulses can be perceived by vehicle 110 occupants to be high urgency haptic outputs based on the pattern and intensity of the haptic output. Perceived urgency of haptic outputs can be determined by psychophysical experiments using driving simulation, for example. In the example shown in FIGS. 8-13, for example, each prompt display 800, 900, 1000, 1100, 1200, 1300 can be accompanied by a pattern of haptic output on a steering wheel 704 to indicate the direction to steer and the urgency with which to steer based on the remaining maneuver time $t_m$ as discussed in relation to FIGS. 8-13. Combining haptic output with prompt displays 800, 900, 1000, 1100, 1200, 1300 can reduce estimated occupant reaction time to execute lane change maneuvers compared to prompt displays 800, 900, 1000, 1100, 1200, 1300 alone, for example.

Figure 18:
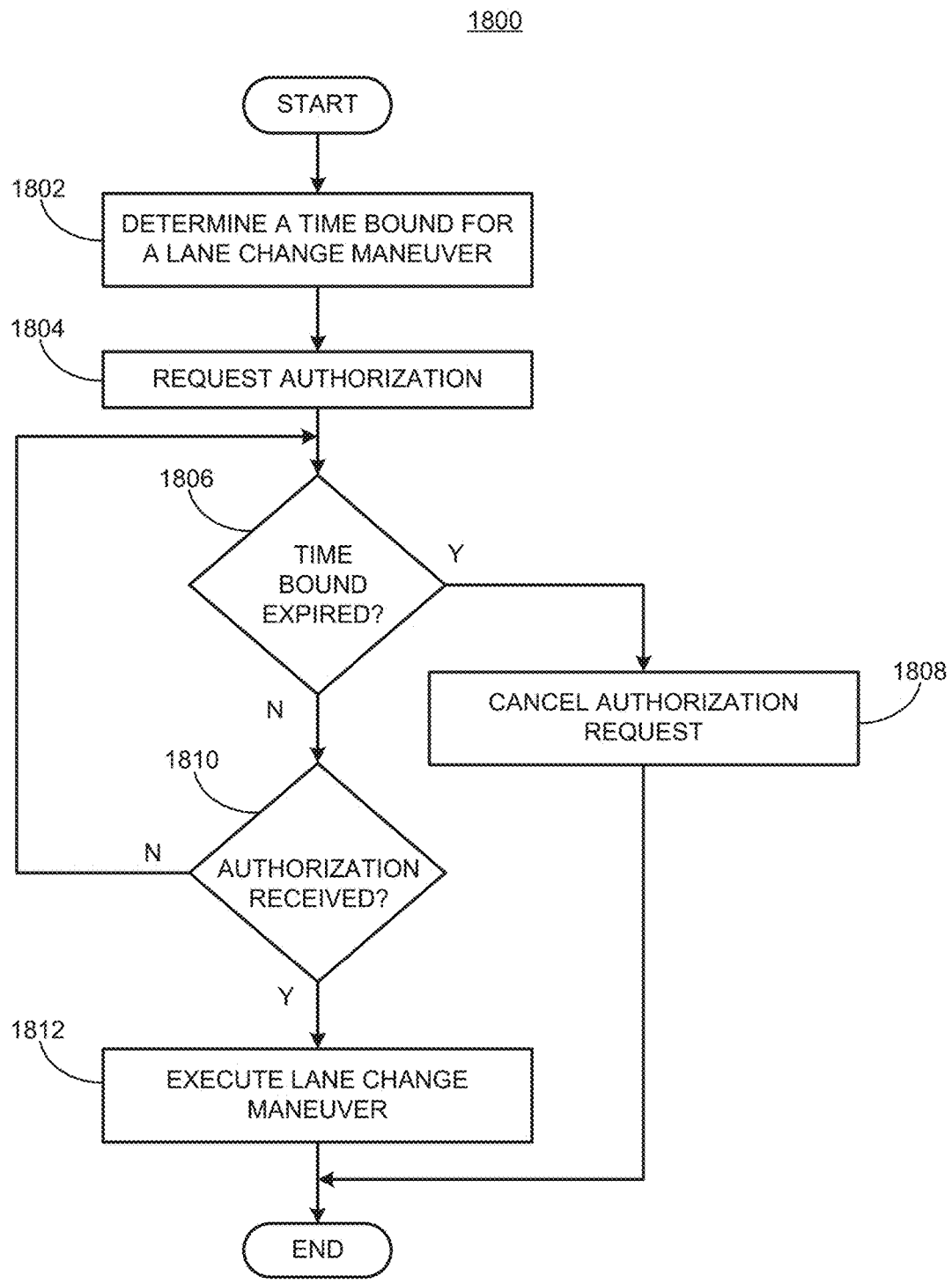
FIG. 18 is a flowchart diagram of an example process to deliver haptic output.

FIG. 18 is a diagram of a flowchart, described in relation to FIGS. 1-17, of a process 1800 for executing a lane change maneuver when authorization is received and canceling the lane change maneuver authorization request when a time bound expires. Process 1800 can be implemented by a processor of computing device 115, taking as input information from sensors 116, and executing instructions and sending control signals via controllers 112, 113, 114, for example. Process 1800 includes multiple steps taken in the disclosed order. Process 1800 also includes implementations including fewer steps or can include the steps taken in different orders.

Process 1800 begins at step 1802, where a time bound is determined for a lane change maneuver. Referring to FIG. 2, a lane change maneuver can include in the plurality of virtual steerable path polynomials 216, 218, for example. The time bound for the lane change maneuver can be the maneuver time $t_m$, which is can be the time between points p1 and p2 on steerable path polynomial 214. At step 1804 computing device 115 can request authorization from an occupant by displaying a prompt, which can include visual prompts, as disclosed in relation to FIGS. 7-13, haptic output, as discussed in relation to FIG. 14 and audio prompts, including synthesized human voice. Displaying a prompt starts reaction time, represented by the time it would take vehicle 202 to travel distance RT at the current speed $V_0$. The reaction time can be a predetermined value based on experimental results that represents an average occupant reaction time, for example.

At step 1806 computing device 115 begins a loop, first checking to see if the time bound determined in step 1802 has expired. If the answer is yes, process 1800 control passes to step 1808 where the authorization request displayed as a prompt to an occupant in step 1804 is canceled and process 1800 then ends. If the answer is no, control passes to step 1810, where computing device 115 checks to see if an authorization has been received from an occupant.

At step 1810, an occupant can indicate authorization or intent to execute a lane change maneuver by inputting torque or rotational force to a steering wheel 704, 1704 in the direction of the lane change maneuver, or inputting authorization or intent to execute a lane change maneuver via a user control interface 706, 1706, before the time bound has expired during maneuver time $t_m$. If the answer is no, computing device 115 loops back to step 1806 to check to see if the time bound has expired. If the answer is yes, control passes to step 1812, where computing device 115 executes a lane change maneuver by piloting vehicle 110 along a virtual steerable path polynomial 216, 218 as discussed above in relation to FIG. 2 and following this step process 1800 ends.

Figure 19:
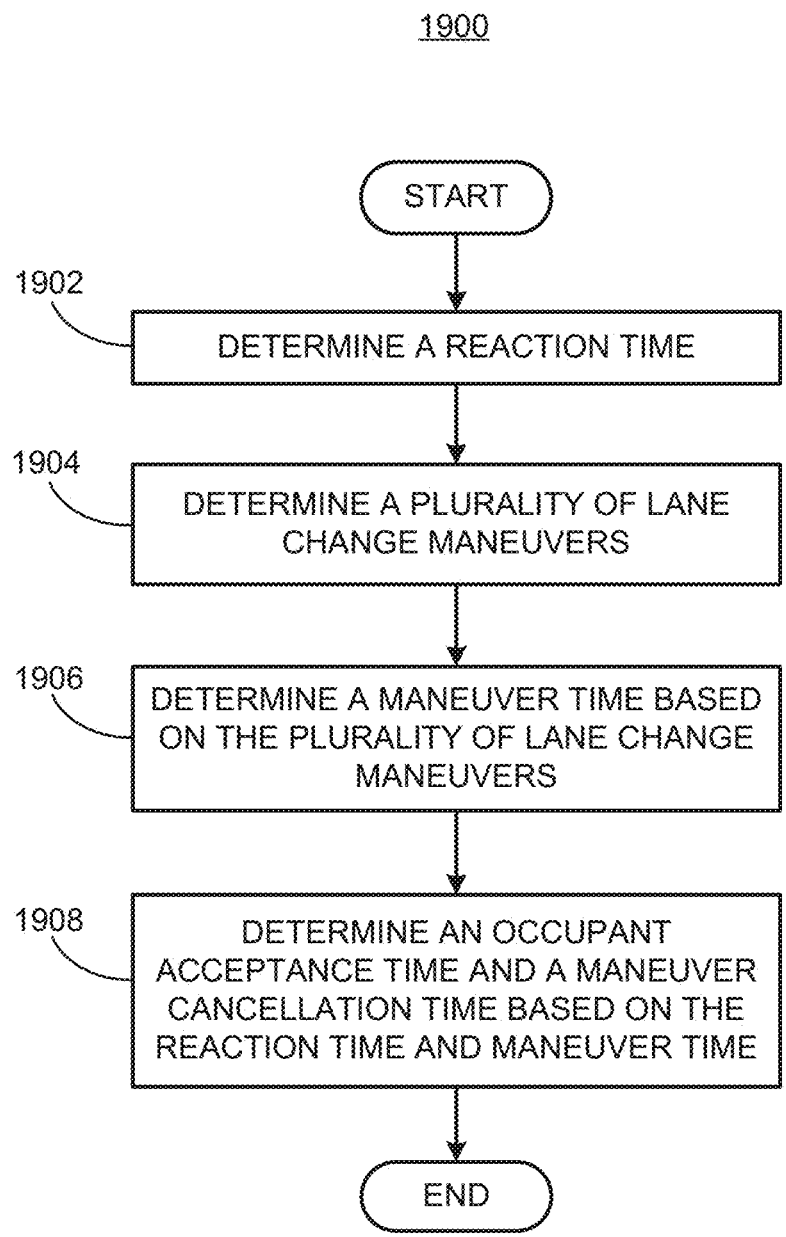
FIG. 19 is a flowchart diagram of an example process to deliver haptic output.

FIG. 19 is a diagram of a flowchart, described in relation to FIGS. 1-17, of a process 1900 for determining an occupant acceptance time and a maneuver cancellation time based on a reaction time and a maneuver time. Process 1900 can be implemented by a processor of computing device 115, taking as input information from sensors 116, and executing instructions and sending control signals via controllers 112, 113, 114, for example. Process 1900 includes multiple steps taken in the disclosed order. Process 1900 also includes implementations including fewer steps or can include the steps taken in different orders.

Process 1900 begins at step 1902, where computing device 115 can determine a reaction time $t_{RT}$. The reaction time $t_{RT}$, as discussed above in relation to FIG. 2, can be based on a predetermined value. The predetermined value can be based on experimental results testing various visual, haptic and audio prompts to determine occupant reaction times as discussed above in relation to FIGS. 7-14. At step 1904, computing device can determine a plurality of lane change maneuvers or field of safe travel 228 as virtual steerable path polynomials 216-218, as discussed in relation to FIG. 2, above. At step 1906, computing device 115 can determine a maneuver time $t_m$, during which time computing device 115 can receive an authorization from an occupant to execute a lane change maneuver, for example.

At step 1908 computing device 115 can determine an occupant acceptance time as equal to the reaction time $t_{RT}$ plus the maneuver time $t_m$ and the cancellation time as the time from the beginning of the lane change maneuver to the end of the lane change maneuver, for example from point p1 to point p3 along virtual steerable path polynomial 316 in traffic scene 300 in FIG. 3. The acceptance time is the time period during which computing device 115 can receive an authorization request from an occupant and execute a lane change maneuver. Cancellation time is the time in which the lane change maneuver can be canceled. Since, as discussed above in relation to FIG. 6, above, cancelling a lane change maneuver can include inverting portions of the lane change maneuver, the lane change maneuver can be canceled up until the end of the lane change maneuver. Following this step process 1900 ends.

Computing devices such as those discussed herein generally each include instructions executable by one or more computing devices such as those identified above, and for carrying out blocks or steps of processes described above. For example, process blocks discussed above may be embodied as computer-executable instructions.

Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored in files and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, e.g., a reference to an "exemplary widget" should be read as simply referring to an example of a widget.

The adverb "approximately" modifying a value or result means that a shape, structure, measurement, value, determination, calculation, etc. may deviate from an exact described geometry, distance, measurement, value, determination, calculation, etc., because of imperfections in materials, machining, manufacturing, sensor measurements, computations, processing time, communications time, etc.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

We claim:

1. A method, comprising:
   determining a time bound for a lane change maneuver based on determining (i) an occupant acceptance time that is a sum of a vehicle maneuver time and a reaction time, and (ii) a maneuver cancellation time;
   after determining the time bound, and without user input, requesting authorization to perform the lane change maneuver;
   determining the time bound has expired; and
   canceling the authorization request and controlling the vehicle based on the time bound having expired.

2. The method of claim 1, further comprising determining the reaction time based on predetermined values.

3. The method of claim 1, further comprising determining the occupant acceptance time based on the reaction time and the vehicle maneuver time.

4. The method of claim 1, further comprising determining the vehicle maneuver time based on the time during which a vehicle can execute the lane change maneuver.

5. The method of claim 1, further comprising determining the maneuver cancellation time based on determining an end of the lane change maneuver.

6. The method of claim 1, further comprising determining the time bound has expired including determining that the lane change maneuver cannot be performed.

7. The method of claim 6, wherein determining the time bound has expired includes determining that reaction time and occupant acceptance time has expired.

8. The method of claim 7, further comprising, receiving input responding to the authorization request before the time bound expires and then controlling a vehicle to perform the lane change maneuver.

9. The method of claim 1, wherein determining the lane change maneuver includes adapting a vehicle trajectory to vehicle traffic in an adjacent lane.

10. The method of claim 9, wherein adapting the vehicle trajectory to vehicle traffic in the adjacent lane includes adapting vehicle position, vehicle speed, and vehicle to traffic in the adjacent lane.

11. A computer apparatus, programmed to:
    determine a time bound for a lane change maneuver based on determining (i) an occupant acceptance time that is a sum of a vehicle maneuver time and a reaction time, and (ii) a maneuver cancellation time;
    after determining the time bound, and without user input, request authorization to perform the lane change maneuver;
    determine the time bound has expired; and
    cancel the authorization request and control the vehicle based on the time bound having expired.

12. The apparatus of claim 11, further comprising determine the reaction time based on predetermined values.

13. The apparatus of claim 11, further comprising determine the occupant acceptance time based on the reaction time and the vehicle maneuver time.

14. The apparatus of claim 11, further comprising determine the vehicle maneuver time based on the time during which a vehicle can execute the lane change maneuver.

15. The apparatus of claim 11, further comprising determine the maneuver cancellation time based on determining an end of the lane change maneuver.

16. The apparatus of claim 11, further comprising determine the time bound has expired including determine that the lane change maneuver cannot be performed.

17. The apparatus of claim 16, wherein determine the time bound has expired includes determine that the reaction time and the occupant acceptance time has expired.

18. The apparatus of claim 17, further comprising receive input responding to the authorization request before the time bound expires and then control a vehicle to perform the lane change maneuver.

19. The apparatus of claim 11, wherein determine the lane change maneuver includes adapt vehicle trajectory to vehicle traffic in an adjacent lane.

20. The apparatus of claim 19, wherein adapt the vehicle trajectory to vehicle traffic in the adjacent lane includes adapt vehicle position, vehicle speed, and vehicle direction to traffic in the adjacent lane.

\* \* \* \* \*